(12) United States Patent
Hoover et al.

(10) Patent No.: US 11,796,478 B2
(45) Date of Patent: Oct. 24, 2023

(54) COSMETIC ITEM FOR PERSONAL SAFETY

(71) Applicant: ESOES COSMETICS LLC, Las Vegas, NV (US)

(72) Inventors: Joy Hoover, Las Vegas, NV (US); Nicolas Letourneau, Raleigh, NC (US); Adam Sandt, Apex, NC (US)

(73) Assignee: ESOES COSMETICS LLC, Las Vegas, NV (US)

( * ) Notice: Subject to any disclaimer, the term of this patent is extended or adjusted under 35 U.S.C. 154(b) by 0 days.

(21) Appl. No.: 17/975,265

(22) Filed: Oct. 27, 2022

(65) Prior Publication Data

US 2023/0126187 A1 Apr. 27, 2023

Related U.S. Application Data

(60) Provisional application No. 63/272,594, filed on Oct. 27, 2021.

(51) Int. Cl.
| | | |
|---|---|---|
| *G01N 21/78* | (2006.01) | |
| *A45D 34/00* | (2006.01) | |
| *G08B 21/02* | (2006.01) | |
| *G01N 21/77* | (2006.01) | |

(52) U.S. Cl.
CPC ............ *G01N 21/78* (2013.01); *A45D 34/00* (2013.01); *G01N 2021/7759* (2013.01); *G08B 21/02* (2013.01)

(58) Field of Classification Search
CPC .......... G01N 21/78; G01N 2021/7759; G01N 21/8483; A45D 34/00; G08B 21/02
See application file for complete search history.

(56) References Cited

U.S. PATENT DOCUMENTS

| | | |
|---|---|---|
| 6,153,147 A | 11/2000 | Craig |
| 7,238,533 B1 | 7/2007 | Legge et al. |
| 8,444,338 B2 | 5/2013 | Kurek et al. |
| 8,747,773 B2 | 6/2014 | Thomas |
| 2001/0046710 A1 | 11/2001 | Cutler |
| 2007/0065338 A1 | 3/2007 | Schindler et al. |

(Continued)

FOREIGN PATENT DOCUMENTS

| | | |
|---|---|---|
| GB | 350206 | 6/1931 |
| WO | 2021064172 A1 | 4/2021 |

OTHER PUBLICATIONS

International Search Report and Written Opinion in corresponding International Patent Application No. PCT/US22/48069 dated Jan. 31, 2023, 13 pages.

*Primary Examiner* — Dennis White
(74) *Attorney, Agent, or Firm* — Greenberg Traurig LLP; Todd C. Basile

(57) ABSTRACT

Descriptions of cosmetic items with personal safety devices are disclosed herein. In some embodiments, the cosmetic items hold personal beautification products such as makeup. In some embodiments, in addition to makeup, the cosmetic items also include a testing assembly which indicates the presences of specific chemicals mixed in liquids such as alcohol or water. In some embodiments, the cosmetic item includes a computer code trigger which initiates an emergency system. In various embodiments the computer code trigger takes the form of a button or printed computer code, and may include a wireless transmitter for sending signals to one or more computers.

17 Claims, 18 Drawing Sheets

(56) References Cited

U.S. PATENT DOCUMENTS

| | | |
|---|---|---|
| 2008/0102482 A1 | 5/2008 | Grossman et al. |
| 2010/0035332 A1 | 2/2010 | Thomas |
| 2011/0195507 A1 | 8/2011 | Dancer |
| 2012/0070901 A1 | 3/2012 | Bradley et al. |
| 2013/0063834 A1 | 3/2013 | Hanchi et al. |
| 2013/0209325 A1 | 8/2013 | Harooni |
| 2015/0274366 A1* | 10/2015 | Cashman ............... B65D 25/04 206/569 |
| 2015/0291338 A1 | 10/2015 | Chen |
| 2015/0301031 A1 | 10/2015 | Zin et al. |
| 2016/0022363 A1 | 1/2016 | Harttig et al. |
| 2016/0257240 A1 | 9/2016 | High et al. |
| 2020/0197928 A1 | 6/2020 | Letourneau et al. |

\* cited by examiner

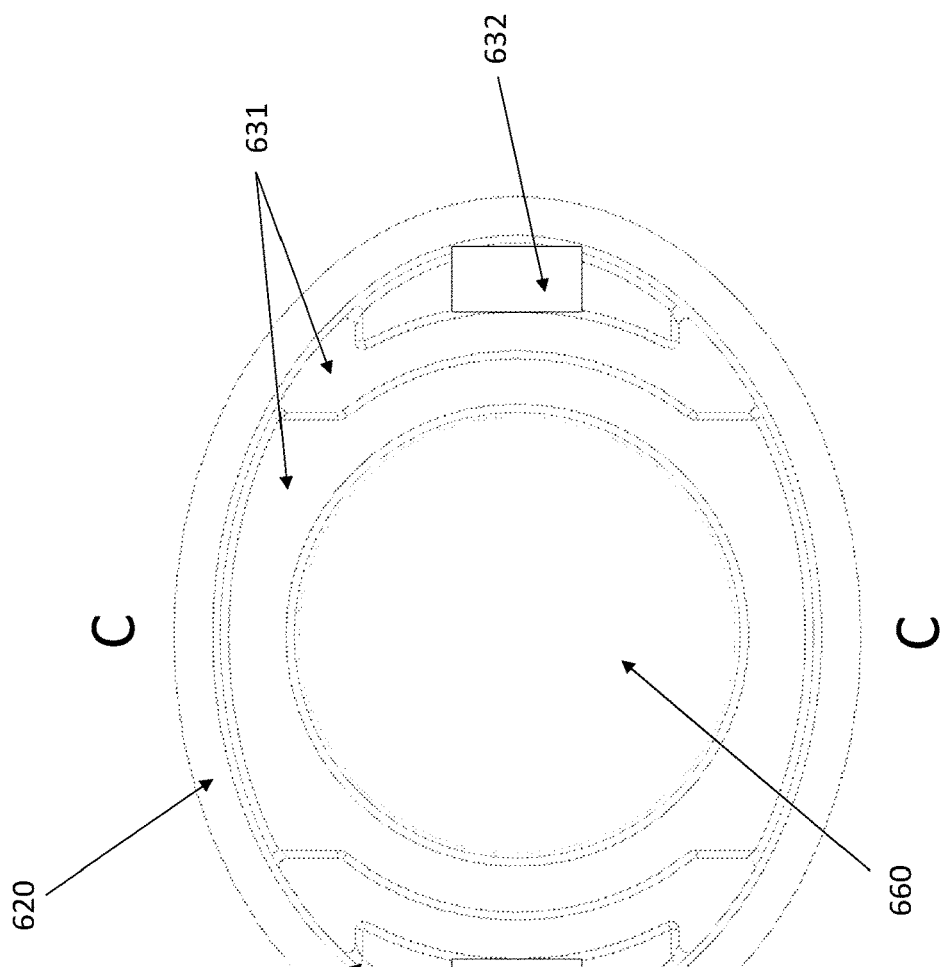
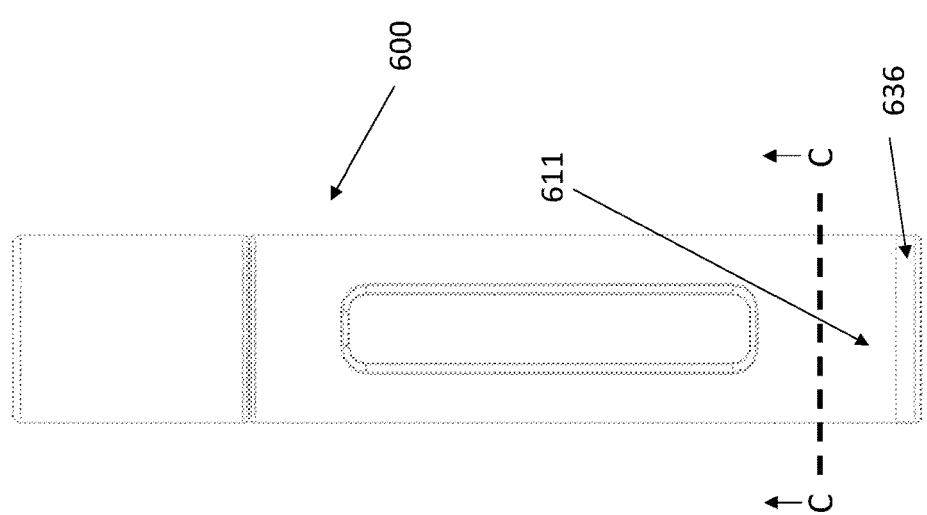
FIG. 14

COSMETIC ITEM FOR PERSONAL SAFETY

CROSS-REFERENCE TO RELATED APPLICATIONS

This application claims the benefit of and priority to U.S. Provisional Application No. 63/272,594, filed Oct. 27, 2021, which is hereby incorporated herein by reference in its entirety for all purposes.

BACKGROUND

In the United States alone, a woman is assaulted every 9 seconds. 1 in 3 women will be victims of domestic violence in their lifetime. Approximately 70 women commit suicide every day in the US following act of sexual violence. Domestic violence is the leading cause of injury to women: more than car accidents, muggings, and rapes combined. There is an economic price to domestic violence as well. Domestic violence victims lose nearly 8 million days of paid work per year in the US, which is the equivalent of 32,000 full-time jobs.

Women are also the perpetual target of strangers with ill intent. One of the most common tools of these predators are so called "date rape drugs" that can cause a victim to become both physically and mentally incapacitated. These illicit drugs can be surreptitiously added to a woman's drink in a social setting and quickly render her vulnerable to sexual assault.

This is an all too common scenario, and even if a stranger has no ill intent, the prospect of being drugged can be frightening and put a damper on social interactions. Efforts to test a drink using conventional methods are likely to be noticeable, and thus women may be hesitant to use them for fear of prompting a dangerous reaction or of offending a suitor. Still further, many women do not know what to do if they find themselves in a potentially dangerous situation. Calls to friends or authorities may be difficult to make without being noticed, or may not be possible once the chemical has taken affect.

Accordingly, there is a need for discrete way to test a beverage for the presence of date rape drugs or other substances by integrating a chemical testing kit with cosmetic items likely to always be carried by the user. There is a further need for a way to clearly and discretely provide contact information for support lines and other sources of help should a user find themselves in a dangerous situation.

SUMMARY

The present disclosure is directed to a cosmetic container comprising a cosmetic item, a chemical testing assembly, and/or an emergency alert system. embodiments presented herein, the system includes a cosmetic item housed within an interior of the container body and accessible via a first removable cap on a first end of the container body. In some embodiments, a chemical testing assembly includes a chemical presence indicator configured to indicate the presence of one or more chemicals within a liquid when the liquid is applied to the chemical presence indicator. The chemical testing assembly is configured for insertion into and removal from an interior of the container body and accessible via a second removable cap on a second end of the container body according to some embodiments.

In some embodiments, the chemical testing assembly is coupled to the second removable cap where removing the removable cap causes the chemical testing assembly to extend from within the interior of the container body and expose at least a portion of the chemical presence indicator for testing. According to various embodiments, at least a portion of the chemical testing assembly is shaped and dimensioned to nest with at least a portion of the cosmetic item when the chemical testing assembly is inserted into the interior of the container body. The testing assembly, in some embodiments, comprises one or more openings proximate the second removable cap through which air within the interior of the container body can escape as the testing assembly is inserted into the interior of the container body via the second end. The cosmetic container, in various embodiments further comprises a moisture absorber in fluid communication with the chemical presence indicator within the interior of the container body.

According to various embodiments, moisture absorber includes desiccant. In some embodiments, the desiccant is not in fluid communication with the cosmetic item within the interior of the container body. Further, in some embodiments, the system includes an electronic module comprising a wireless transmitter and an actuator exposed to an exterior of the cosmetic container and configured to cause the wireless transmitter to emit a signal to be received by an electronic device when actuated. In some embodiments, the signal is configured to, when received by an electronic device, cause a processor of the electronic device to execute instructions stored on non-transitory computer readable media in communication with the processor. In some embodiments, the instructions cause the electronic device to initiate an emergency alert system. The instructions, in various embodiments, cause the electronic device to communicate a predetermined message to an electronic device of a predetermined recipient. The wireless transmitter and the actuator are contained within the second removable cap in one or more embodiments.

In some embodiments, the system includes one or more apparatuses configured for testing chemical compositions. According to various embodiments, the system comprises one or more of a cosmetic container configured to house one or more cosmetic items and one or more chemical presence indicators configured to indicate the presence of one or more chemicals within a liquid when the liquid is applied to the chemical presence indicator. In some embodiments, the chemical presence indicator is coupled to the cosmetic container. In some embodiments, the chemical presence indicator comprises a testing strip or a testing token. In some embodiments, the chemical presence indicator is coupled to an outer surface of the cosmetic container and covered with a protective covering. According to various embodiments the chemical presence indicator is coupled to an inner surface of the cosmetic container and the cosmetic container is configured to be opened to expose the chemical presence indicator for testing.

The chemical presence indicator, according to some embodiments, is coupled to an inner surface of a removable lid or cap of the cosmetic container. The cosmetic container comprises an interior portion within which the chemical presence indicator is housed, and, in one or more embodiments, the cosmetic container includes an opening through which the chemical presence indicator can be removed from within the interior of the cosmetic container.

In some embodiments, the cosmetic container includes a member having a first portion configured to be inserted into the interior portion of the cosmetic container and a second portion forming an outer surface of the cosmetic container when the first portion is fully inserted into the interior portion of the cosmetic container. The member, in various embodiments, is configured to extend outwards from the cosmetic container to expose at least some of the first portion of the member to an area outside of the cosmetic container. The chemical presence indicator is coupled to the first portion of the member such that a corresponding portion of the chemical presence indicator is exposed for testing when the member is extended outwards from the cosmetic container according to some embodiments. The member, according to various embodiments, comprises a testing shuttle affixed to an end cap of the cosmetic container.

In various embodiments, the system further comprises at least one of a printed code that, when read by an electronic device, causes a processor of the electronic device to execute instructions stored on non-transitory computer readable media in communication with the processor, and an electronic module comprising an actuator and a wireless transmitter. In some embodiments, actuating the actuator causes the wireless transmitter to emit a signal that, when received by an electronic device, causes a processor of the electronic device to execute instructions stored on non-transitory computer readable media in communication with the processor. In some embodiments, the instructions cause the electronic device to initiate an emergency alert system.

BRIEF DESCRIPTION OF THE DRAWINGS

Illustrative, non-limiting example embodiments will be more clearly understood from the following detailed description taken in conjunction with the accompanying drawings.

FIG. 14 shows a cross-section view C-C of the cosmetic container 600 according to some embodiments.

DETAILED DESCRIPTION

Embodiments of the present disclosure are directed to systems and methods (collectively referred to as the "system") to end self-directed, interpersonal, and collective violence by providing tools that increase safety and solidarity. As described in more detail herein, the system can include a cosmetic item with integrated chemical test strips that can be accessed and used to discretely to test for date rape drugs in a beverage. Since the test strips are part of a cosmetic item, it is liable to always be on a woman's person at bars, clubs, and other social situations where she is likely to drink beverages prepared or brought to her by others. The test strips are protected from contamination when not in use, either via protective films that can be peeled off or by the cosmetic item housing itself. When a woman feels her cocktail may have been tampered with, she can pull out a test strip and dip it in her drink, or she can put a droplet from the beverage on a test strip that's built into the housing of the cosmetic item. A hotline number or other contact information can be provided on the test strip or elsewhere on the cosmetic item to aid the woman to find help or support in a potentially dangerous situation as further described.

In various embodiments, the cosmetic item or components thereof (e.g., test strips) may be provided with one or more computer code triggers configured to cause certain computer code to be executed on one or more computers to accomplish an intended function. For example, in an embodiment, a printed code (e.g., QR code, barcode 160 as later described) may be affixed to the cosmetic item or printed on a test strip that causes certain code to be executed when the printed code is read by a mobile phone camera, scanner, or other sensor. As another example, the cosmetic item may be equipped with an electronic module (e.g., alert module 640 as later described) that, when activated (e.g., by pressing an actuator button), causes certain code to be executed on, for example, a companion device. In various embodiments, the computer code to be executed is configured to cause the one or more computers to send an emergency message to persons or agencies designated by the user (e.g., friends, family, police), amongst other features related to protecting the safety of the user in a potentially dangerous situation.

Structure

Figure 1:
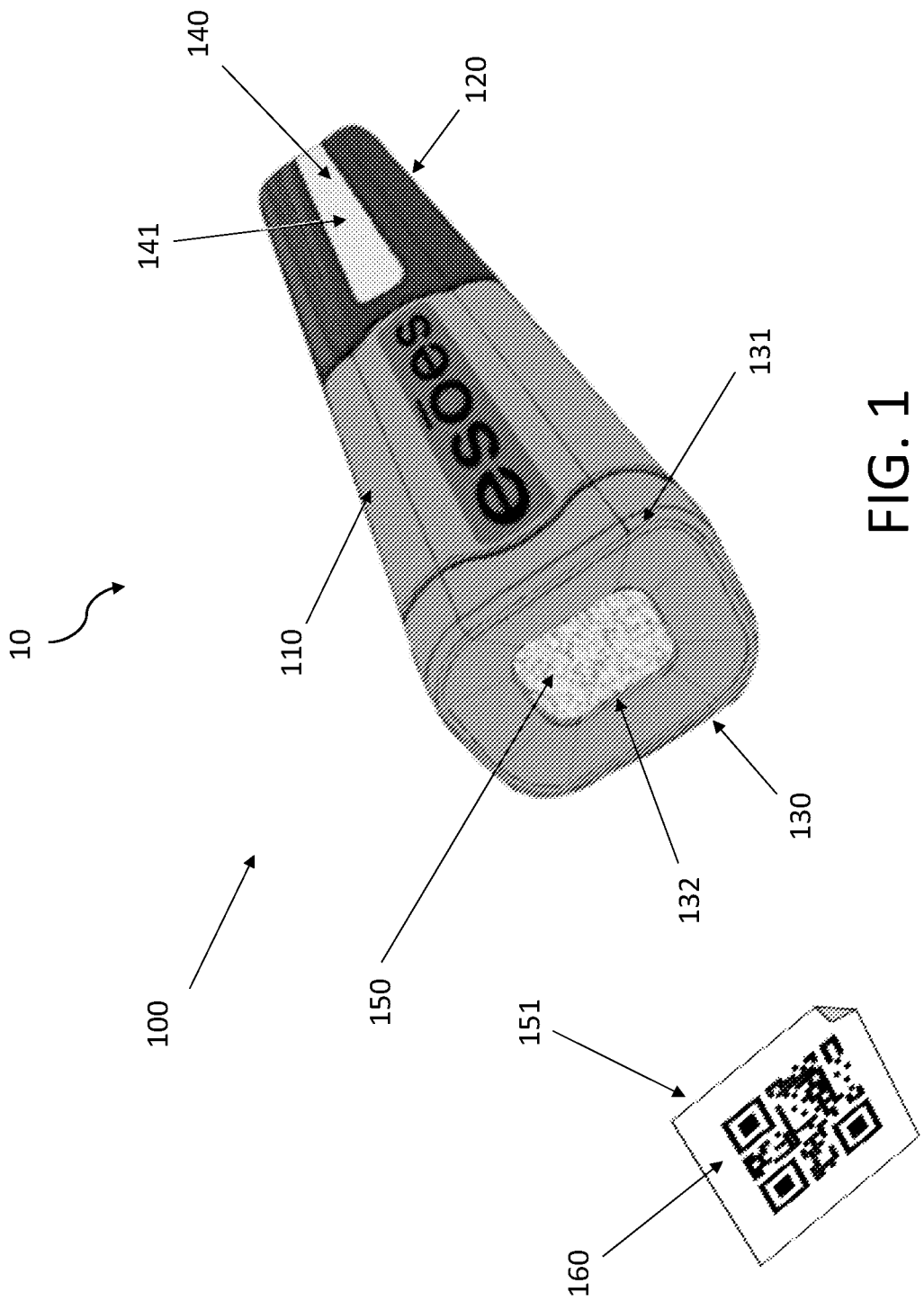
FIG. 1 shows the system embodied as a lipstick container 100.

FIG. 1 shows aspects of the system 10 embodied as a lipstick container 100. In some embodiments, the lipstick container 100 includes a container body 110, a container cap 120, a twist cap 130, and one or more testing assemblies (i.e., test kits) that include one or more test strips 140 and/or one or more test tokens 150. In various embodiments the container body 110 is sized, configured, and arranged to house a cosmetic product which in this non-limiting example is lipstick (not shown). The lipstick is protected by a container cap 120 which is removable to expose the lipstick for application in a conventional manner. In this particular example, the container cap 120 comprises one or more chemical presence indicators with one or more chemical testing surfaces such as test strips 140 and/or an adhesive cover 141, as non-limiting examples.

As is the same for all chemical presence indicators presented herein, the one or more test strips 140 are configured to detect the presence of one or more chemicals and/or present a visual confirmation (e.g., a color change, shape appearance) if the one or more chemicals are found. In some embodiments, the color and/or shape corresponds to a specific chemical to facilitate proper medical treatment should the user be exposed. The test strips 140 may be secured to the container cap 120 by a removable adhesive cover 141 which also protects the test strips 140 from contamination. In various embodiments where multiple test strips 140 are secured to the container cap 120, the adhesive cover 141 is configured to reattach to the container cap 120 multiple times.

In various embodiments the system may also comprise a twist cap 130 configured to raise or lower the lipstick housed in the container body 110 in a conventional manner when rotated. In some embodiments, the twist cap 130 comprises one or more test tokens 150 configured to detect the presence of a chemical substance as previously described. In some embodiments, the one or more test tokens 130 are secured in place by a token cover 131. In various aspects of the system the token cover 131 is removably attached to the twist cap 130 (and/or container cap 120) by one or more conventional fasteners, enabling removal and/or replacement of the test token 150.

Figure 4:
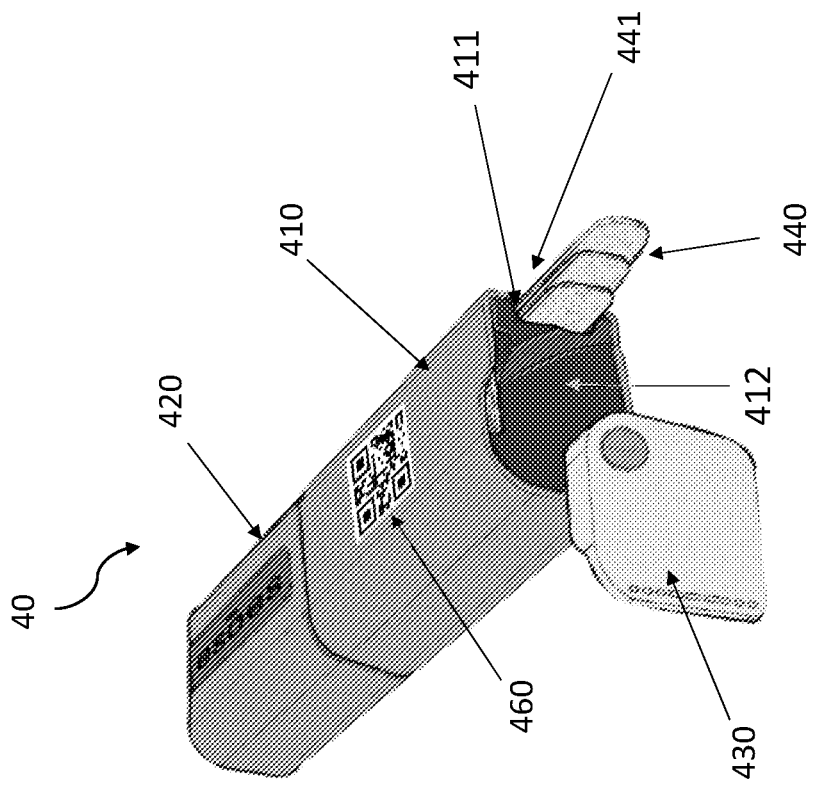
FIG. 4 shows various aspects of the system described in relation to one or more other figures implemented on a cosmetic container 400.

Advantageously, embodiments of the token cover 131 include a test opening 132 configured to enable a liquid to be transferred to the test token 150 without removing the token cover 131 and/or the test token 150. This unique aspect of the system enables a user to discretely place a droplet of a beverage and/or a wet object (e.g., finger, napkin, straw, etc.) that has been dipped into a suspected comprised liquid directly onto the test token 150 and see the results in a discrete manner. The test opening 132 is also configured to enable the user to insert the container body 110 into the liquid to expose the test token 150 to the substance. This feature improves safety by helping to mask the testing from a perpetrator that may still be nearby. The token cover 131 may comprise a removable adhesive token cover 151 similar to adhesive strip cover 141 and/or a door (not shown) similar to door 430 as shown in FIG. 4 in order to protect the test token 150 from contamination. One or more adhesive covers described herein include a computer code 160 which may, for any system configuration described herein, include computer code for implementing various aspects of the emergency alert system as further described below.

According to a method of use for the FIG. 1 embodiment, a user enjoying a Saturday night out after a long work week may be distracted by a cheering crowd gathered nearby whose team has just won a championship. High-fives and congratulations are abound as the user engages with the excited fans. Upon returning to their drink, the user notices what appears to be specks of dust floating on the surface of the drink. The user is suspicious, but scared to draw unwarranted attention. The user reaches into their bag and removes the adhesive cover 151 from the token cover 131 and takes out the lipstick container 100. With one hand the user moves the drink to the other side, discretely dipping a finger into the beverage, and places the wet finger on the test opening 132. The user removes the container cap 120 and applies their favorite lipstick while awaiting the results. By the time the lipstick is applied, the results are in, and the appearance of a negative sign in a green color confirms that the dust is more likely the result of unsanitary cleaning practices than foul play. Relieved, the user asks the bartender for a clean glass, and takes comfort in the fact that additional test strips 140 are available should they need to perform another test.

Figure 2:
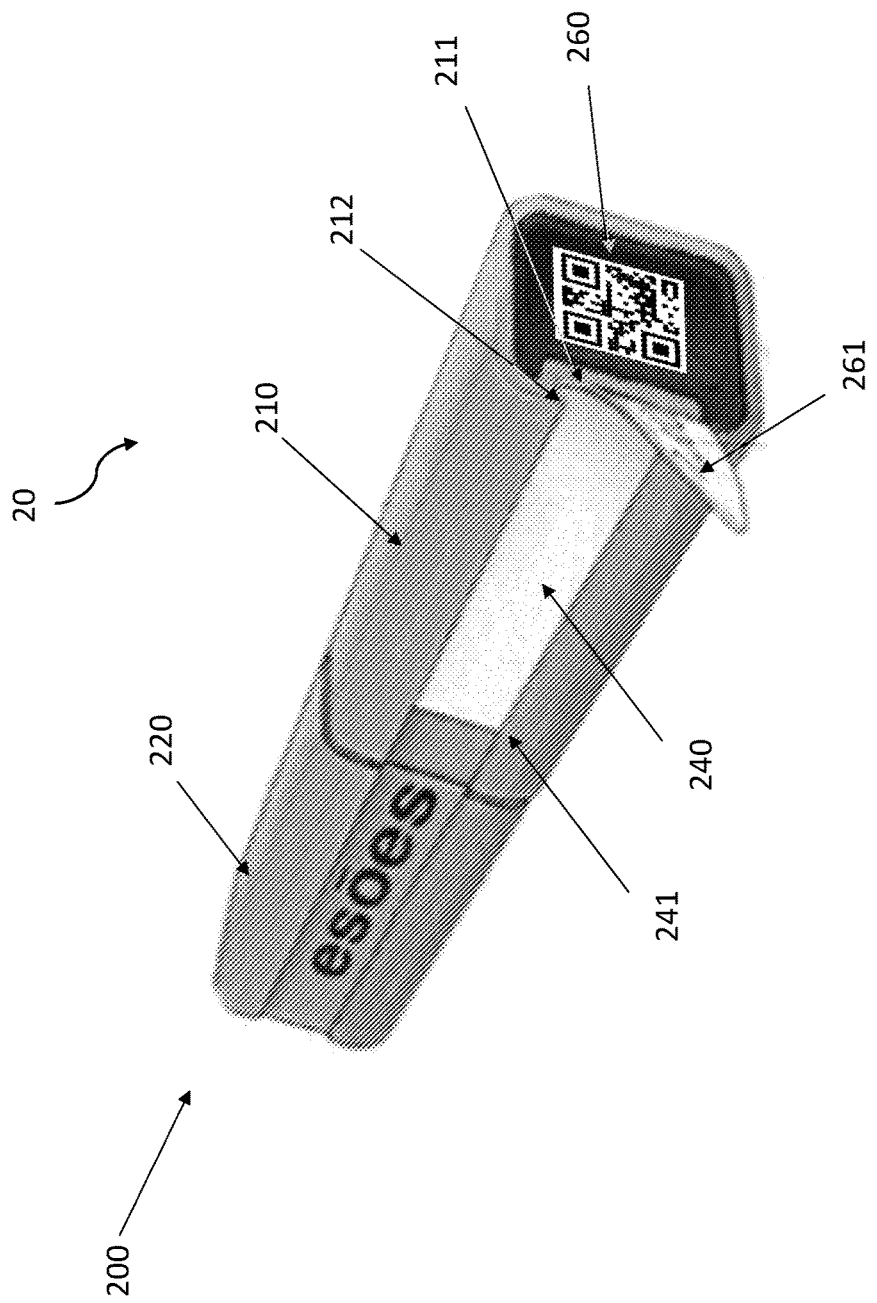
FIG. 2 shows alternate arrangements of one or more system features described in FIG. 1 in a second lipstick container embodiment 200.

FIG. 2 shows alternate arrangements of one or more system 20 features described in FIG. 1 in a second lipstick container embodiment 200. Similar to FIG. 1, the lipstick container 200 includes a container body 210, a container cap 220, test strips 240, and emergency system computer code 260. Various embodiments include a recess 211 integrated into the lipstick container 200 which secures one or more test strips 240 in place with a recess edge 212.

According to a method of use for FIG. 2, in the situation as previously described, the user reaches into a bag to retrieve the lipstick container 200 in response to noticing a foreign substance in her drink. She slides her thumb within the recess 211 ejecting one of several test strips 240 from the test strips (i.e., indicator) housing section 241. The user dips the test strip directly into the drink, and watches in horror as the strip turns red and the words "Drug Detected" appear embedded on the surface. She is scared, and unsure what to do, so she calls the emergency hotline number located on the test strip 240 that is part of the emergency message 261. A representative implements various aspects of the emergency alert system as further described herein, and the woman receives medical attention and monitoring for negative effects of the illegal drug, which is specifically identified by the red color.

Figure 3:
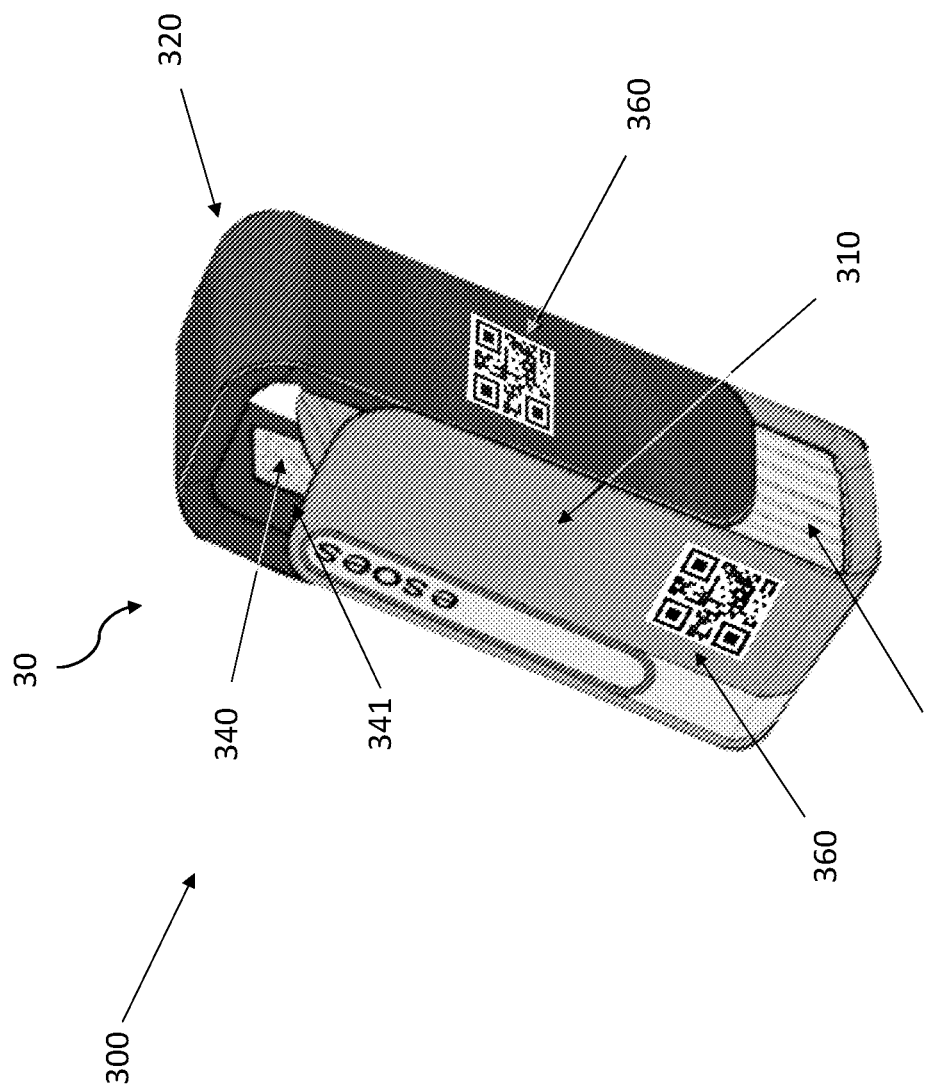
FIG. 3 demonstrates how various aspects from other figures can be integrated into different cosmetic containers such as nail polish container 300.

FIG. 3 demonstrates how aspects of other figures can be integrated into different cosmetic containers which in this non-limiting embodiment of the system 30 is a nail polish container 300. Similar to other figures, the nail polish container 300 comprises a container body 310, a container cap 320, one or more test strips 340, one or more test tokens 350, and one or more printed computer codes 360. The nail polish container 300 may be configured to house a nail polish bottle (not shown) such that undesirable rotation of the nail polish bottle cap (not shown) is prevented by the sliding interfering fit of the container body 310 and the container cap 320. This configuration is also useful for housing pencil liners, for example, as well as combinations of two or more cosmetic items such as face liners, lip primers, and/or mascara where the system 30 is embodied as a cosmetic container kit.

One unique aspect of the system 30 presented in this embodiment is that the test strips 340 are inside the container cap 320 in an (chemical presence) indicator housing section in the form of a test trip housing section 341 in some embodiments to protect the test strips from contamination. The test strips 340 may also have an adhesive cover (not shown) in some embodiments and/or be removably secured into one or more recesses (not shown) as previously described. In some embodiments, the test strip 340 is exposed (i.e., not sealed) such that a liquid may be tested without removing the test strip 340 from the container cap 320. In some aspects defining a method, a user suspicious that their drink may have been tampered with can obtain results by dipping at least a portion of the container cap into a beverage such that at least a portion of the test strip 340 is exposed to the liquid. This is advantageous for users concerned about having a chemical coming in contact with and/or being absorbed through the skin. Various embodiments of the system include a container cap 320 configured to display the results of the test strip 340 to a user at a first angle while hiding the results from one or more other angles by using one or more sides of the container cap 320 and/or the container body 310 as a visual shield. This feature allows a user to hide knowledge of the results from those in close proximity, buying time to allow the authorities to arrive and investigate the perpetrator while they may still feel emboldened to look for other targets.

Another unique aspect of the system 30 shown in FIG. 3 is the location of a test token 350 attached to a side of the container body 310. According to various embodiments the nail polish container 300 is configured and arranged to cover at least a portion of the test token 350 with the container cap 320, protecting it from contamination. In some embodiments, at least a portion of the contain body 310 proximate to the test token 310 is configured to seal (e.g., is continuously solid) the contents of the container body 310 from external fluid. This arrangement enables the portion of the container body 310 proximate the test token 350 to be inserted into a liquid for chemical testing without damaging internal objects according to a method of use. Alternatively, this arrangement allows for a wet object (e.g., finger, napkin) to be placed on the test token 350 without the need to remove an adhesive cover by simply sliding up at least a portion of the container body 310 to expose the test token 305. In some embodiments, the location of the test token on the container body 310 is configured to display the results of the test token 350 to a user at a first angle while hiding the results from one or more other angles by using one or more sides of the container body 310 and/or the container cap 320 as a visual shield.

FIG. 4 shows various aspects of the system 40 described in relation to one or more other figures implemented on a cosmetic container 400. In this non-limiting example, the cosmetic container 400 is configured and arranged to house a cosmetic item, such as lipstick, eyeliner, or the like. In some embodiments, the cosmetic container 400 includes a container body 410, a container cap 420, a door 430, one or more test strips 440, and computer code 460.

According to various aspects of the system the container body 410 may comprise one or more elongated recesses 411 configured to hold one or more test strips 440 and/or test tokens (not shown). In some embodiments, the container body 410 comprises a substantially hollow container core 412 configured to house a conventional cosmetic product (not shown). As is evident from the drawings, the system 40 can be implemented as an external cover for various types of cosmetic products. In some embodiments, the system 40 is configured to enable the exchange of different cosmetic items (e.g., various lipstick colors) within the cosmetic container 400 while retaining full system functionality.

As a non-limiting example, a user may insert a conventional eyeliner bottle (not shown) into the container core 412 where it is held in place by friction and/or by closing the door 430. Closing the door 430 also secures the test strips 440 with the container body 410. The user secures the eyeliner cap (not shown) to the container cap 420 by friction fit and/or any conventional fastening method. The container cap 420 and the container body 410 may comprise cooperating threads that enable the container cap 420 and/or the eyeliner cap to be removed by rotation of the container cap 420. The user can access the test strips 440 by opening the door 430 exposing the test strips (indicator) housing section 441 to implementing chemical testing according to any embodiments described herein.

As a non-limiting example of a method of use, a bar patron starts to feel a little woozy after only a couple of drinks. A stranger comes alone and asks her if she is feeling ok, and offers her a ride home. Something is not right; this is not a "buzz" feeling coming over her and the effects are increasing even though she has stopped drinking. The woman tells the stranger she is going to get a refill and walks up to the bar and is greeted by the bartender. With her back to the stranger, she pulls out the cosmetic container 400, opens the door 430, and removes one of the test strips 440 from the container body 410. The bartender observes curiously as this droopy eyed patron dips the test strip into the beverage, and together they stare at the strip as it turns bright blue. Almost incoherent at this point, the female passes the strip to the bartender who reads an emergency message printed on the strip notifying the bartender that she has been drugged. Security is called, along with an ambulance, and the stranger is detained until police arrive. The woman is taken to the hospital and makes a full recovery: the stranger is convicted of assault and possession of a controlled substance and spends the next several years in prison.

Figure 5:
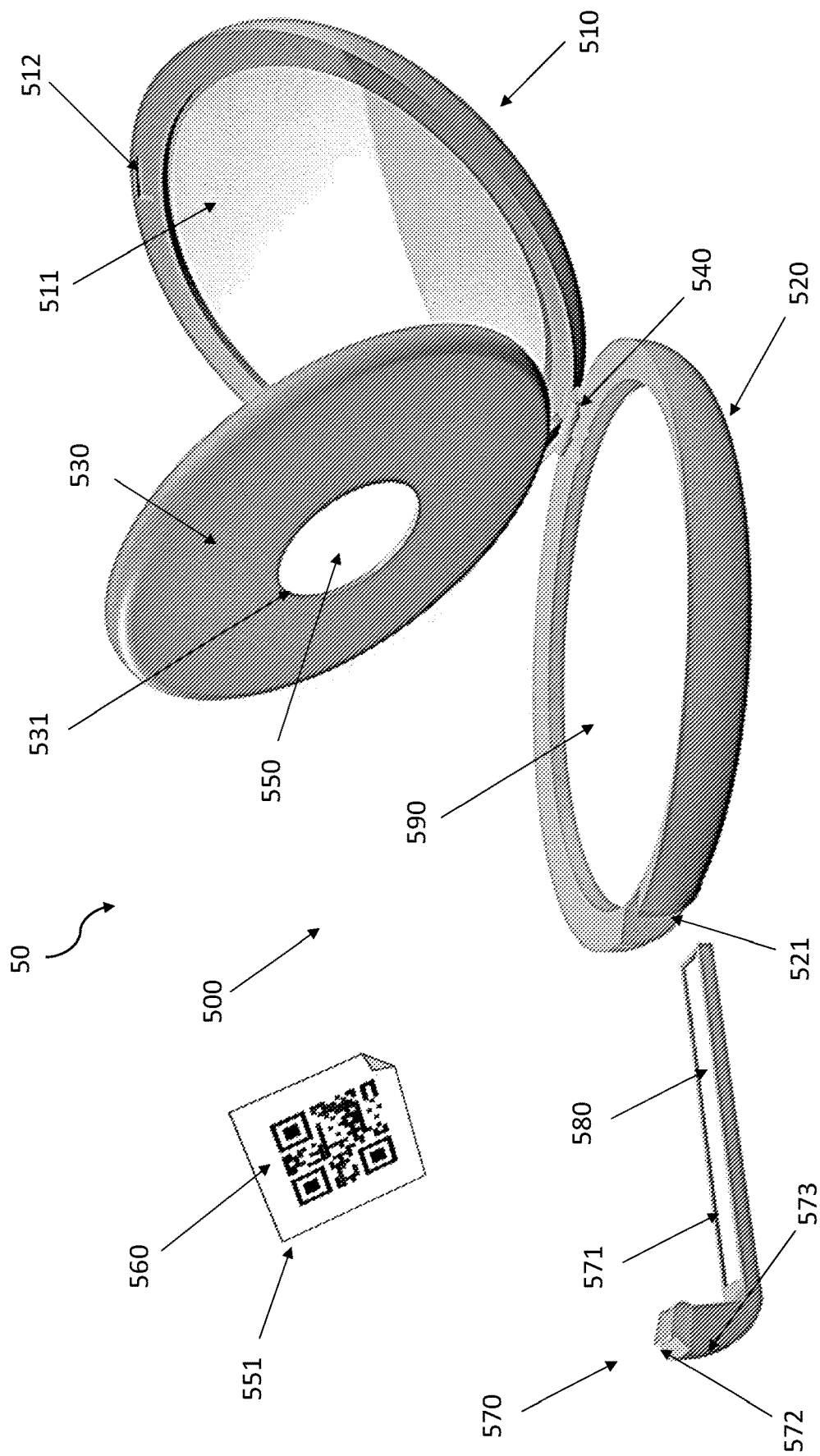
FIG. 5 depicts some arrangements of the system that include a compact cosmetic container 500 with integrated testing embodiments.

FIG. 5 depicts some arrangements of the system 50 that include a compact cosmetic container 500 with integrated testing embodiments. In some embodiments, the system 50 comprises one or more of a top body 510, a bottom body 520, a middle body 530, and a removable testing stick 570. The top body 510 includes a mirror 511, as well as a fastening recess 512 configured to mate with a fastening edge 572 formed on an end of the testing stick 570. Advantageously, the testing stick 570 is prevented from sliding outward from and elongated housing recess (not shown) within the stick housing 521 by the fastening recess 512 when the compact cosmetic container 500 is in a closed arrangement. Likewise, the fastening edge 572 is also configured to at least partially secure and/or lock the top body 510 to the bottom body 520 by snap fit when the compact cosmetic container 500 is closed.

Pushing on the testing stick 570 front wall 573 may disengage the fastening edge 572 from the fastening recess 512 enabling the top body 510 to rotate about the hinge 540 to open the compact cosmetic container 500 according to various embodiments. Various aspects of the system 50 include a middle body 530 configured to house a cosmetic item (e.g., an application pad, makeup; not shown). In some embodiments, rotating the middle body 530 about the hinge 540 exposes a cosmetic product (e.g., application pad, foundation) such as makeup 590, housed in the bottom body 520. Rotating the middle body 530 also exposes a test token 550 removably secured within a token recess 531 in various embodiments. The test token 550 is protected from the makeup 590 by an adhesive cover 551 that may include computer code 560 similar to embodiments previous described. In any embodiment of the system, a testing embodiments such as token 550 and/or test strip 580 may include an adhesive backing configured to enable a testing surface to be couple to and/or secured to a container surface (e.g., within a container recess). This arrangement enables the test token 550 to be exposed to a wet finger or napkin containing beverage fluid without removing the test token 550 from the compact container 500 surface. The adhesive cover 551 can be replaced onto the middle body 530 to cover the test token 550 after use to preserve evidence and/or prevent cross-contamination with makeup 590.

Referring again to FIG. 5, various embodiments include a testing stick 570 that includes a testing strip 580 which in this example is removably secured within a stick recess 571 by an adhesive backing such that it can be replaced with another testing strip 580 after use. In some embodiments, the testing stick 570 is configured to be inserted in a stick housing 521 comprising an elongated recess (not shown) where it is slidable and/or removably held in position by friction. When the compact container 500 is open as shown, the testing stick 570 is free to slide out of the stick housing 521 after overcoming any friction force. Advantageously, the testing stick 570 enables the testing strip 580 to be inserted into a suspect liquid for chemical testing without the need for a user to touch the testing strip 580.

In an example scenario, two friends are out enjoying an evening when one friend starts to feel extremely dizzy. This is a sudden onset and makes the other friend suspicious of the cause. Luckily, the suspicious friend has invested in a compact container 500 that has both the test token 550 and the test strip 580 integrated as shown. She pulls out the testing stick 570 and dips it into her friend's drink and her worst fears are realized when the test returns a positive result for a date rape drug. Concerned for her own safety, the prepared friend removes the adhesive cover 551 surrounding the token recess 531 and proceeds to dab the test token 550 with a sample from her own drink, which she has not touched in some time. Again, the test comes back positive for the same date rape drug. She immediately scans the computer code 560 which implements various aspects of the emergency alert system as described herein. She also shows the results to a manager, who uses this evidence to justify making an announcement to the entire bar that a patron's drink has been compromised. As police arrive to review video footage from security cameras a waitress collects all drinks on the floor. Patrons are advised to stay put and see the paramedics waiting outside that have automatically been called by the system if they feel start to feel ill.

It is understood that the system can be adapted for use with all conventional cosmetic bodies such as eyeshadows, lip liners, powders, and the like. In addition, the features from each figure depicting some embodiments are readily borrowed and/or combinable with features from other figures. For example, the test strips shown attached to the cap in FIG. 1 can instead be located on the body as shown in figure FIG. 2 while not changing other aspects of FIG. 1. As another example, the testing stick 570 can be incorporated into the container body 410 without departing from the scope of the system. Therefore, the figures are only an aid to help those of ordinary skill make and use the system by borrowing from the various examples presented herein.

Figure 6:
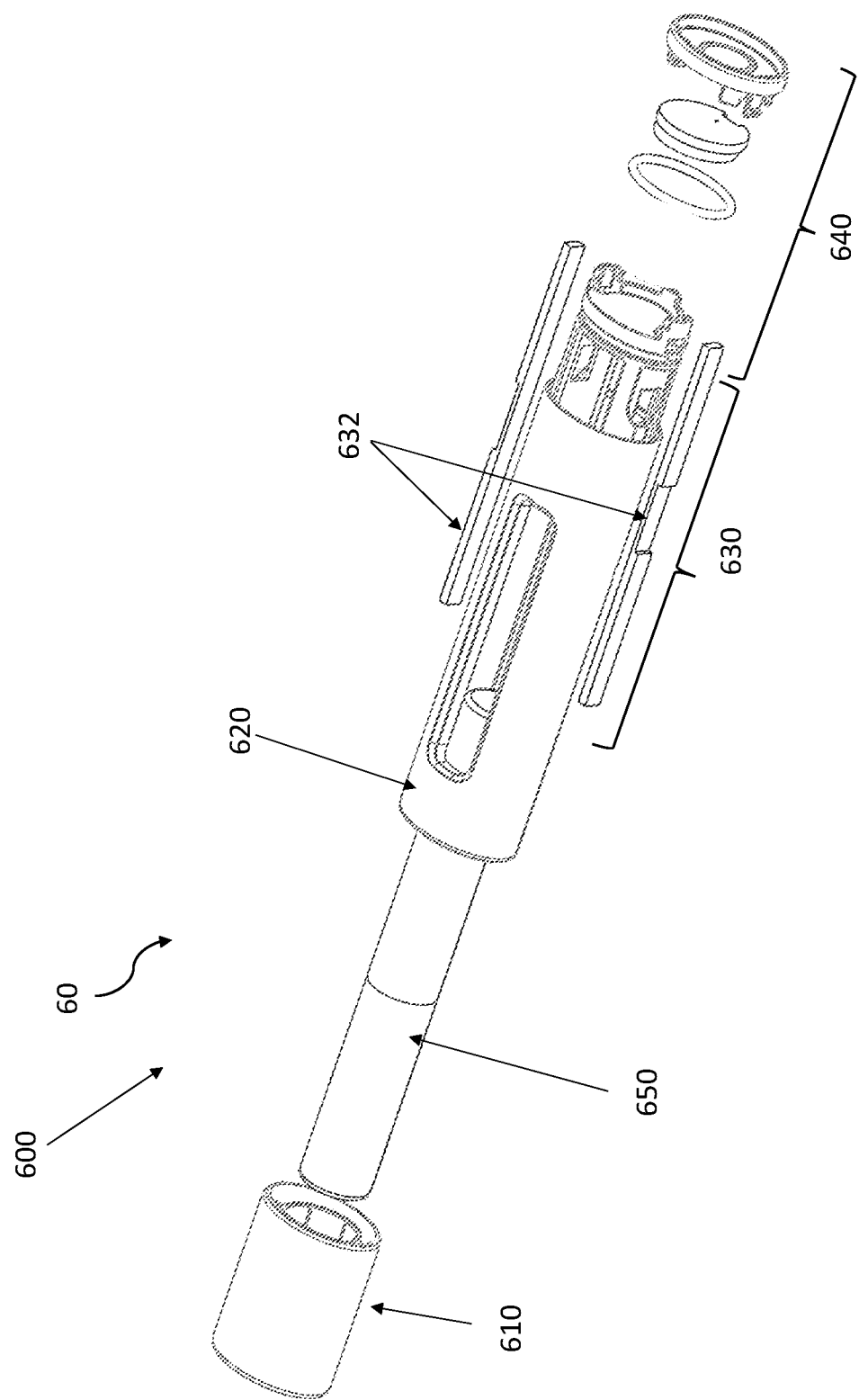
FIG. 6 depicts a partial exploded view of a system 60 in the form of a cosmetic container 600 according to some embodiments.
Figure 7:
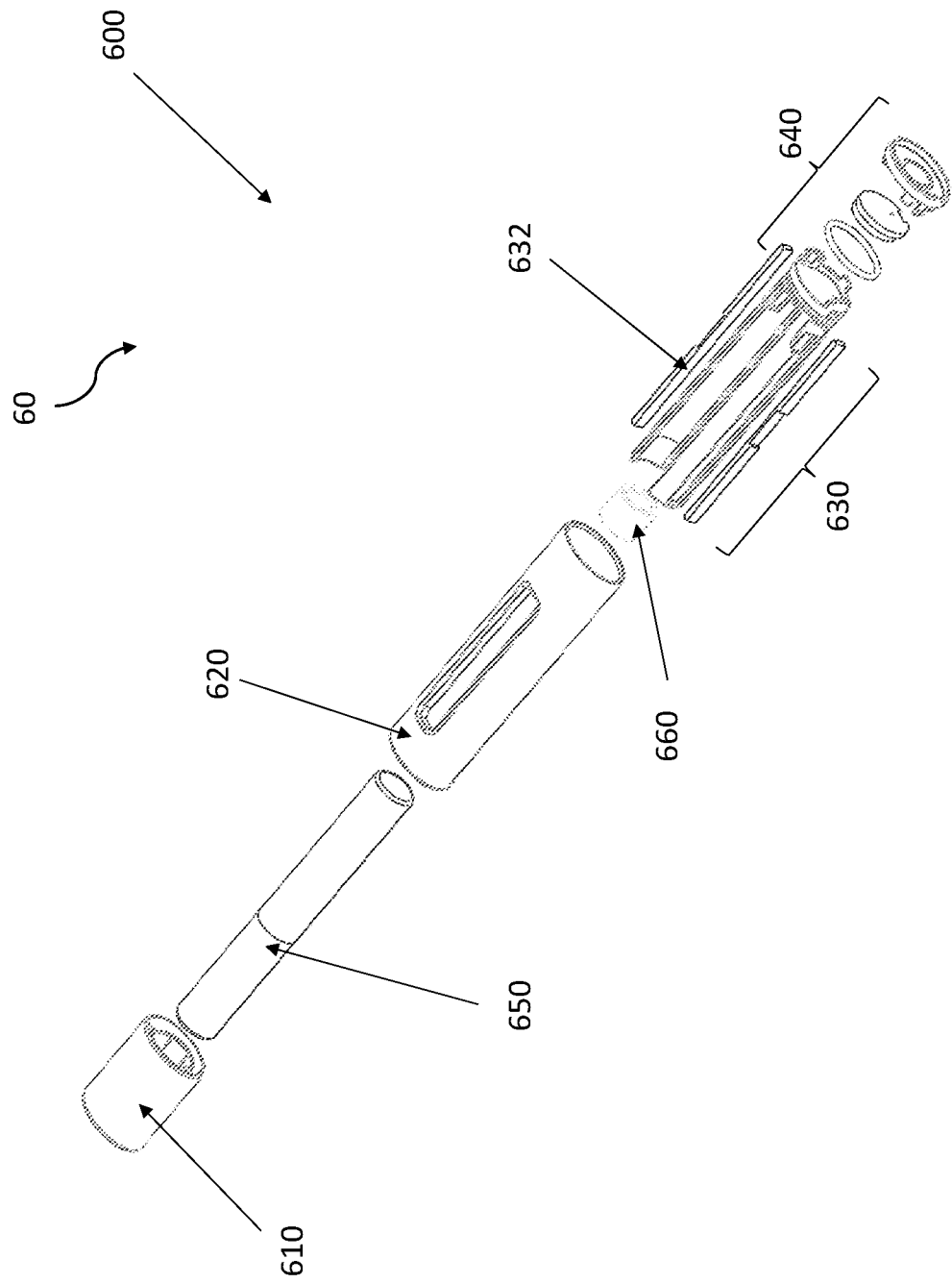
FIG. 7 depicts a full exploded view of the cosmetic container 600 according to some embodiments.

FIG. 6 and FIG. 7 depict partial and fully exploded views of a system 60 in the form of a cosmetic container 600, respectively. Cosmetic container 600, in various embodiments, may generally comprise a container body 620 configured to house a cosmetic item 650, a chemical testing assembly 630 with one or more chemical presence indicators 632, and an alert module 640. Generally speaking, cosmetic item 650 may be an ordinary, functional cosmetic item (e.g, a container of liquid lipstick), while chemical testing assembly 630 and alert module 640 allow a user to discretely test for certain chemicals and signal for help. As further described herein, chemical testing assembly 630, in various embodiments, can be removed from within container body 620 to expose chemical presence indicator(s) 632 for testing and then inserted back into container body 620 to protect chemical presence indicator(s) 632 from outside contaminates, such as moisture and debris when not in use, and alert module 640, in various embodiments, can be pressed or otherwise actuated by a user to cause an alert to be sent to designated persons or agencies. A removable container cap 610 may enclose one end of container body 620, and a moisture absorber 660 may be provided within chemical testing assembly 630 to absorb moisture that may become trapped within container body 620 and thereby enhance the life of chemical presence indicator(s) 632.

Figure 8:
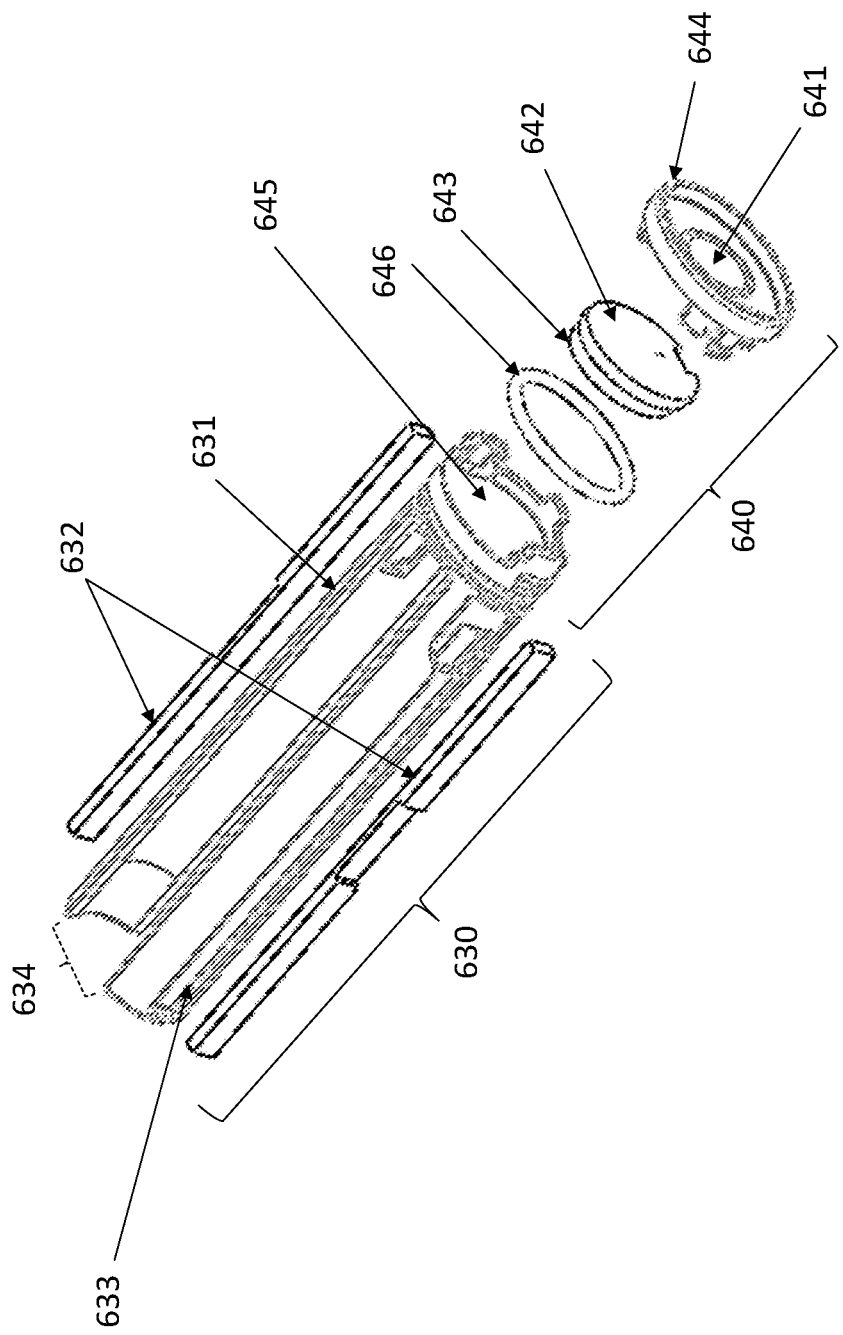
FIG. 8 depicts a full exploded view of chemical testing assembly 630 and alert module 640.

FIG. 8 depicts a fully exploded view of chemical testing assembly 630 and alert module 640. Chemical testing assembly 630, in various embodiments, may include a testing shuttle 631 configured to be inserted into and removed from container body 620. For clarity, in some embodiments, testing shuttle 631 may be configured to be completely removed from container body 620 such that container body 620 becomes two completely separate pieces, while in other embodiments, testing shuttle 631 and/or container body 620 may include a stop or other mechanism that prevents testing shuttle 631 from separating from container body 620, such that testing shuttle 631 extends from and retracts into container body 620. For ease of description, the movement of testing shuttle 631 in both of the immediately aforementioned configurations will be referred to as being "inserted into" and "removed from" container body 620, and it should be understood that this is not intended to be limiting to just one such configuration. Indicator housing sections 633 (e.g., recesses) in an outer surface of testing shuttle 631 may be configured to receive and secure chemical presence indicators 632, such as test strips, tokens, and the like. Testing shuttle 631, in various embodiments, may have a smaller outer diameter than the inner diameter of container body 620 and an inner diameter larger than an outer diameter of cosmetic item 650, such that testing shuttle 631 can "nest" with cosmetic item 650 when testing shuttle 631 is inserted into container body 620. Testing shuttle 631 may further include an open portion 634 having a shape and dimensions that complement viewing window 621 (later shown in FIG. 9) so that, when open portion 634 is aligned with viewing window 621, a user can still see cosmetic item 650 through viewing window 621 when testing shuttle 631 is in an inserted position. Container body 620, in various embodiments may be keyed such that, when testing shuttle 631 is properly inserted, the open portion 634 on the testing shuttle 631 aligns with the viewing window 621, such that the cosmetic item 650 is visible through the viewing window 621 to determine color, content, level, etc. The viewing window 621 also provide the benefit of masking the true nature of the cosmetic container 600, as its function as a cosmetic product is clearly visible. Although this non-limiting example has an oval shape, any shape with at least one asymmetrical feature, including projections and protrusions, can be used to keep the testing shuttle 631 in alignment with the container body 620 during assembly which may have corresponding features.

Alert module 640, in various embodiments, may include an actuator 641, a wireless transmitter 642, and a battery 643. In the embodiment shown, actuator 641 is built into an end cap 644 of cosmetic container 600 and the aforementioned components may be positioned between end cap 644 and a base 645 to form the module. As configured, when a user depresses actuator 641 (shown here as a button), wireless transmitter 642 receives power from battery 643 and emits a signal. In various embodiments, the signal may be received by a companion device, such as a mobile phone of the user, and cause the companion device to send a preset message or other notice to designated persons or agencies or perform other features described herein. Base 645, in turn, may be coupled to the end of testing shuttle 631 such that alert module 640 travels with testing shuttle 631 when testing shuttle 631 is extended from and inserted back into container body 620. An o-ring 646 (also shown in FIG. 16) may form a tight seal between end cap 644 and container body 620 when testing shuttle 631 is fully inserted into container body 620 and thereby prevent moisture encroachment.

Figure 9:
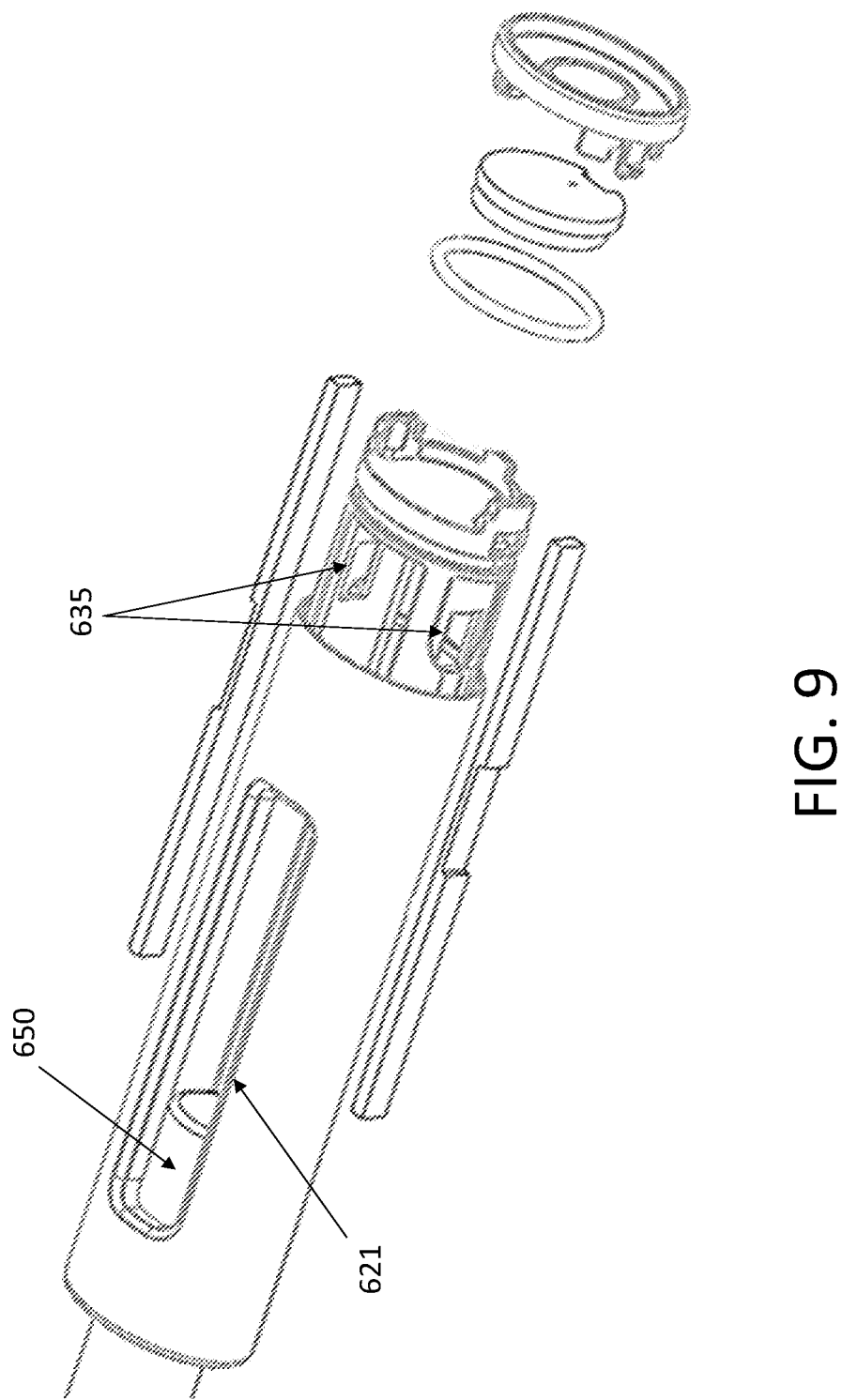
FIG. 9 depicts a partial exploded view of chemical testing assembly 630 and alert module 640.

FIG. 9 depicts a partially exploded view of chemical testing assembly 630 and alert module 640, in which testing shuttle 631 is partially inserted into container body 620.

Testing shuttle 631, in various embodiments, may include one or more openings 635 positioned proximate the distal end of testing shuttle 631, as shown. As positioned, air within container body 620 can escape through openings 635 until just before testing shuttle 631 is fully inserted and o-ring 646 forms a seal, thereby minimizing the amount of air that may become trapped within container body 620. Exposure to air can unduly limit the life of a chemical presence indictor 632. This is especially true when the chemical presence indicator 632 is in the form of a testing strip, where exposure to a chemical causes a change in the testing strip appearance. Openings 635 provide the benefit of preventing overpressurization of the container body 620 and/or preventing humid air from being trapped and absorbed by the one or more chemical presence indicators 632.

It should be noted; however, that a small amount of air may still become trapped inside the container body 620 after testing shuttle 631 is fully inserted and the o-ring sealed. Over time even a small amount of air or humidity can cause issues, so a removable moisture absorber 660 (e.g., a desiccant) may be positioned within testing shuttle 631 as a novel solution to remove residual moisture. As positioned, moisture absorber 660 is placed into fluid communication with chemical presence indicators 632 to draw moisture out of any trapped air to which chemical presence indicators 632 are exposed within container body 620.

As later shown in and described with reference to FIG. 13 and FIG. 16, moisture absorber 660 may be physically separated from cosmetic item 650 by cosmetic chamber 622 to prevent moisture absorber 660 from drying out cosmetic item 650. If, alternatively, moisture absorber 660 were in fluid communication with cosmetic item, moisture absorber 660 could potentially dry out cosmetic item 650 and, in turn, become spent prematurely thereby reducing its effectiveness in absorbing moisture from air trapped within container body 620. It may also be advantageous to separate cosmetic item 650 from fluid communication with chemical presence indicators 332 such that chemical presence indicators 632 do not become contaminated by liquid from cosmetic item 650.

Figure 10:
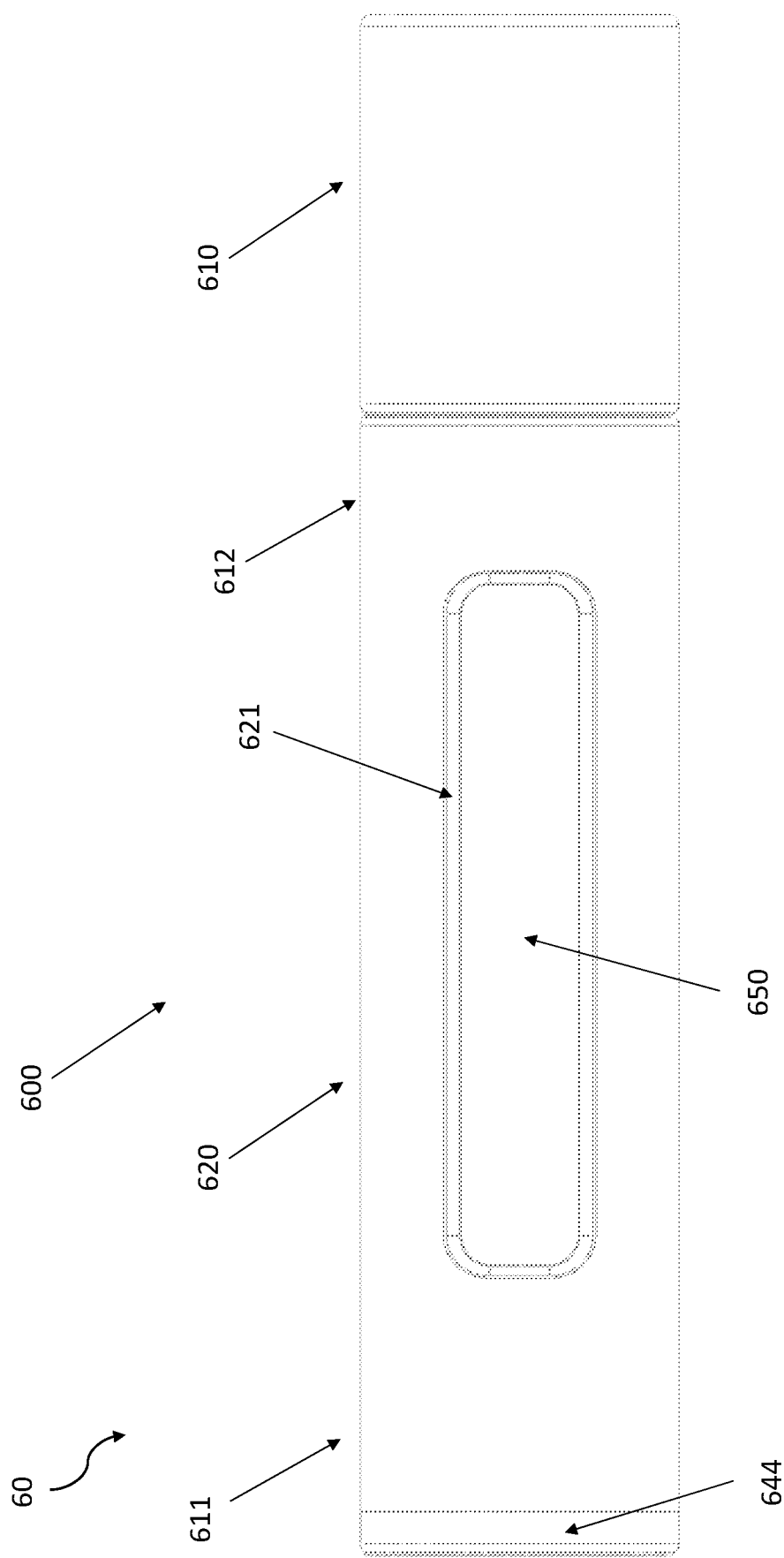
FIG. 10 depicts the cosmetic container 600 in a fully assembled state according to some embodiments.

FIG. 10 depicts the cosmetic container 600 in a fully assembled state according to some embodiments. As shown in various embodiments described herein, container cap 610 is located at and/or configured to couple to a container first end 612 of the container body 620. Viewing window 621 is positioned over cosmetic item 650.

Figure 11:
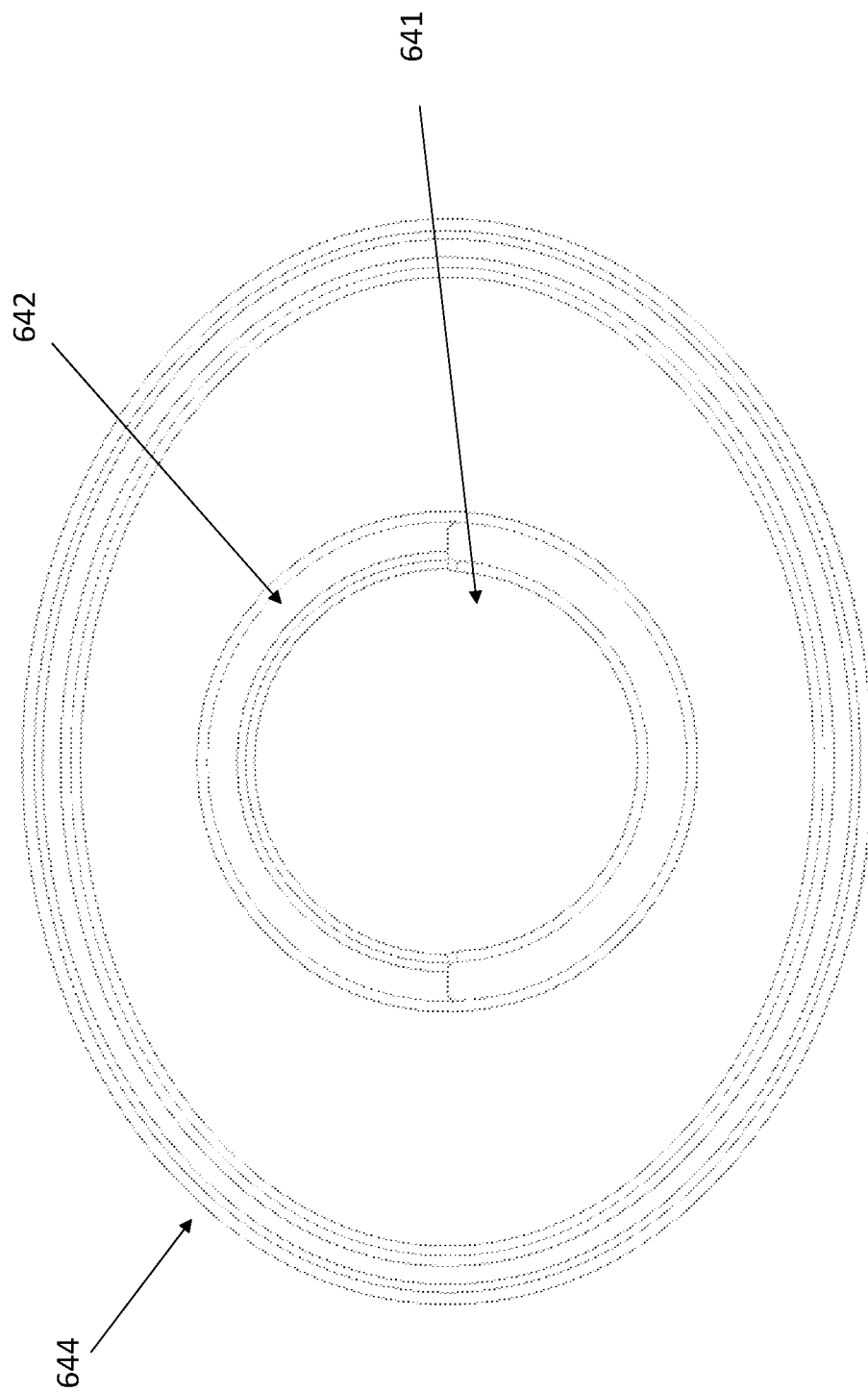
FIG. 11 illustrates aspects of a bottom portion of the cosmetic container 600 according to some embodiments.

FIG. 11 illustrates aspects a bottom portion of the cosmetic container 600 according to some embodiments. Shown in this view are end cap 644, wireless transmitter 642, and actuator 641. In some embodiments, at least a portion of end cap 644, or o-ring 646 if equipped, is configured to contact at least a portion of the container body 620 at least partially seal the testing assembly 630 from atmosphere. In some embodiments, the actuator 641 comprises an actuator button. In some embodiments, the actuator 641 is configured to activate wireless transmitter 642 which is configured to send a wireless signal to one or more computers (e.g., cell phone(s), computer networks, etc.).

Figure 12:
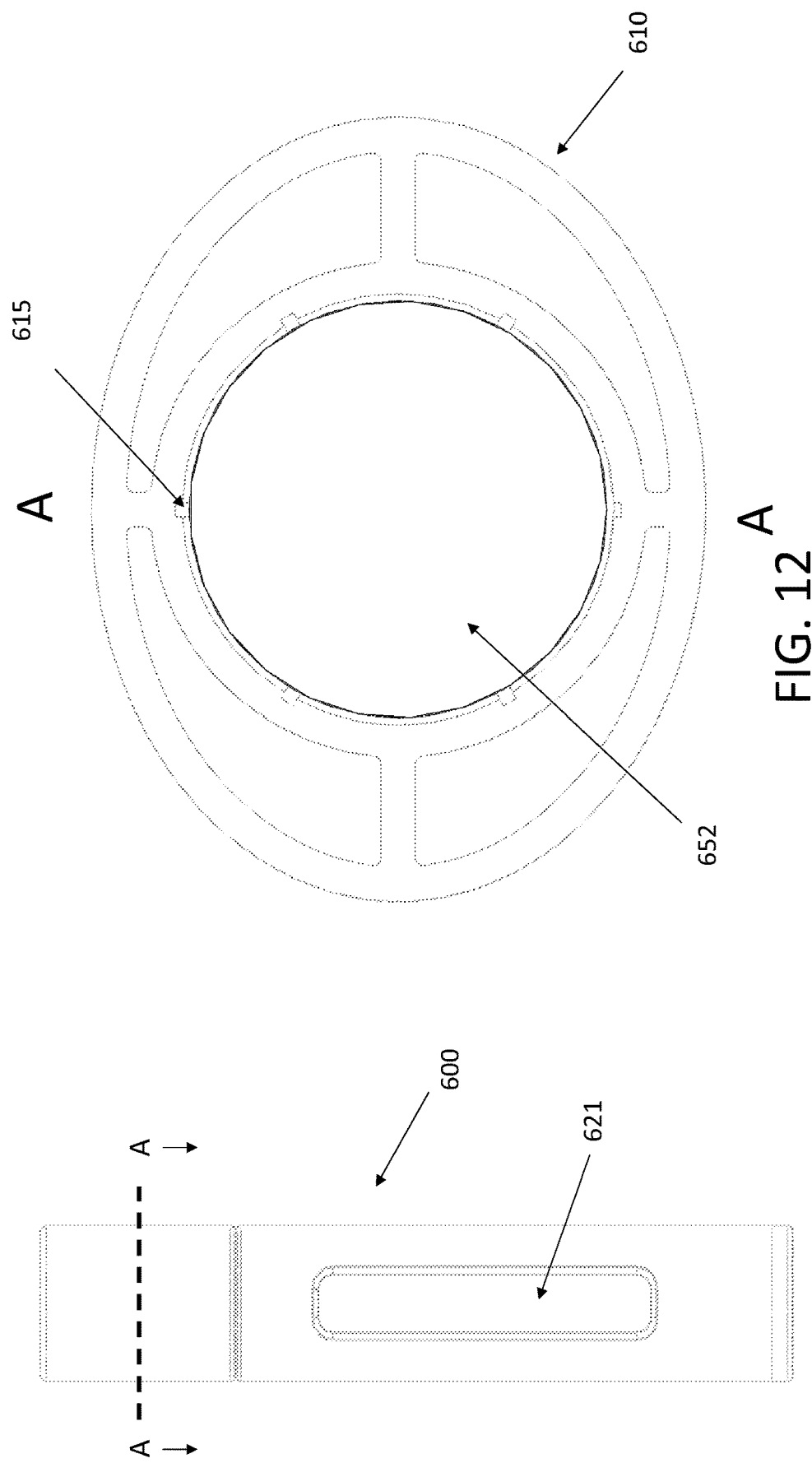
FIG. 12 shows a cross-section view A-A of the cosmetic container 600 according to some embodiments.

FIG. 12 shows a cross-section view A-A of the cosmetic container 600 according to some embodiments. Container cap 610 is configured to encase at least a portion of cosmetic item 650, which in this example is the item second portion 652. One or more couplers 615 may secure item second portion 652 (see also FIG. 16) within the interior of cap 610, such as through a friction fit or adhesive.

Figure 13:
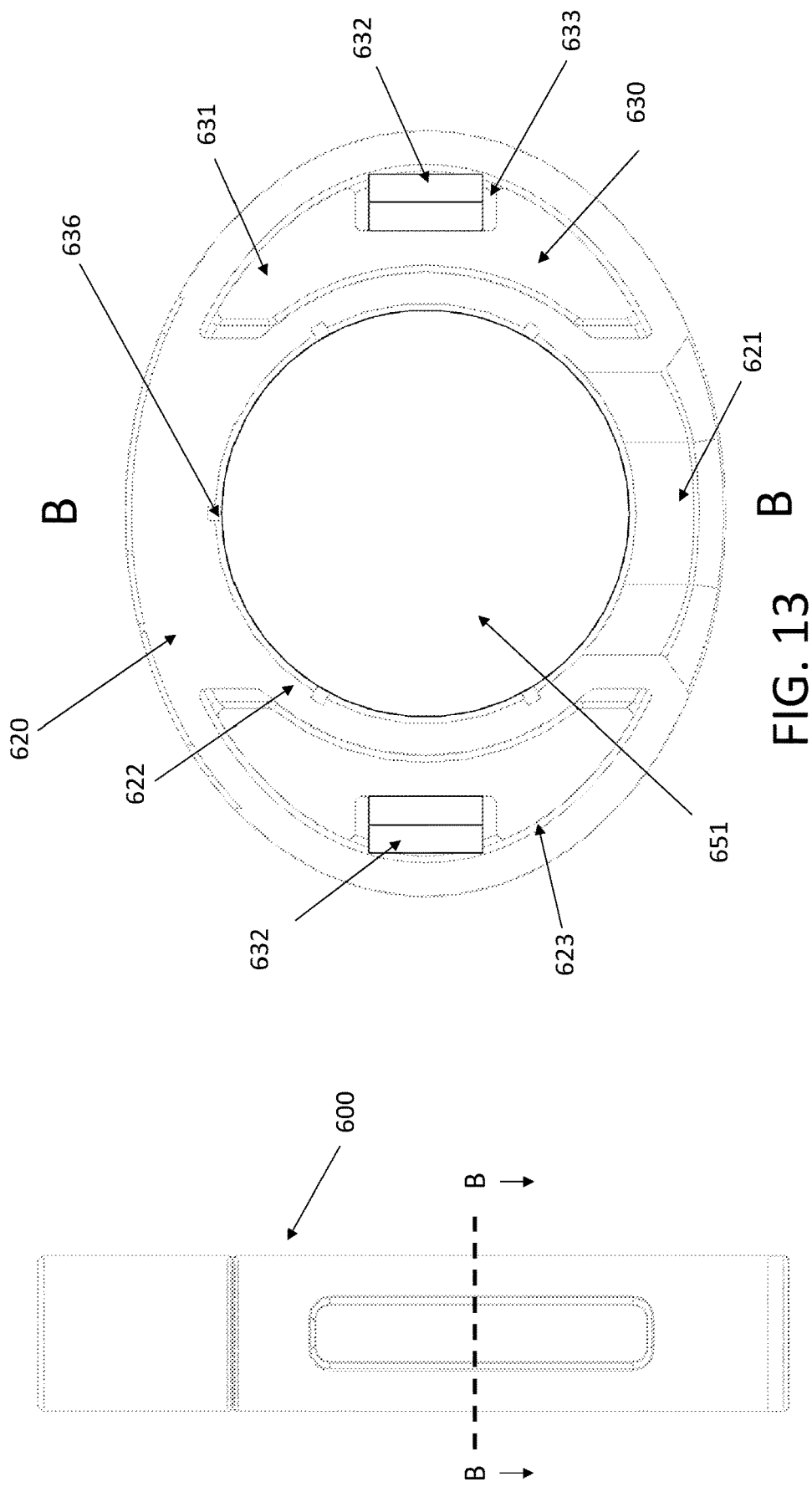
FIG. 13 shows a cross-section view B-B of the cosmetic container 600 according to some embodiments.

FIG. 13 shows a cross-section view B-B of the cosmetic container 600 according to some embodiments. As previously noted, in some embodiments, the testing shuttle 631 comprises one or more indicator housing sections 633 configured to enable one or more chemical presence indicators 632 to reside between the container body 620 and the testing shuttle 631 when the testing shuttle 631 is inserted into container body 620. As shown in this non-limiting example, the indicator housing sections 633 include slots recessed into the testing shuttle 631. In various embodiments, the testing shuttle 631 is configured to at least partially surround the cosmetic chamber 622 when the cosmetic item 650 is inserted into the container body 620. Cosmetic chamber 622 may include one or more couplers 636 configured to secure item first portion (see also FIG. 16) within cosmetic chamber 622. In some embodiments, the cosmetic chamber 622 is integrally formed with the chamber body 620 such that it forms a "bucket" for the cosmetic item 650 when viewed from the top with the container cap 610 removed. In some embodiments, the cosmetic chamber 622 walls are continuously solid with the exception of the opening provided when the container cap 610 is removed, thereby separating the cosmetic item 650 from fluid communication with chemical presence indicators 332 such that chemical presence indicators 332 do not become contaminated by liquid from cosmetic item 650. The container body 620 also forms shuttle chambers 623 which take the form of two "crescent moon" cavities in FIG. 13. The shuttle chambers 623 allow the testing shuttle 631 to be nested within the container body 620 while remaining fluidly separated from the cosmetic chamber 622 to prevent the moisture absorber 660 from damaging the cosmetic item 650.

FIG. 14 shows a cross-section view C-C of the cosmetic container 600 according to some embodiments. This view is below a bottom of the cosmetic chamber 622. Visible in this view is the moisture absorber 660 at least partially surrounded by the testing shuttle 631, which is surrounded by the container body 620. The moisture absorber 660 includes desiccant according to some non-limiting examples. As later shown best in FIG. 16, in some embodiments, the testing shuttle 631 comprises at least one fluid path 637 configured to provide a path for air to travel between the one or more chemical presence indicators 632 and the moisture absorber 660 when the testing shuttle 631 is housed within the container body 620 and at least a portion of the actuator cap 644 is in contact with the container second end 611. In various embodiments, openings 635 may serve as fluid paths 637, as shown. As previously described, the one or more fluid paths 637 enable fluid communication to the chemical presence indicators enabling moisture removal from their location extending product life.

Figure 15:
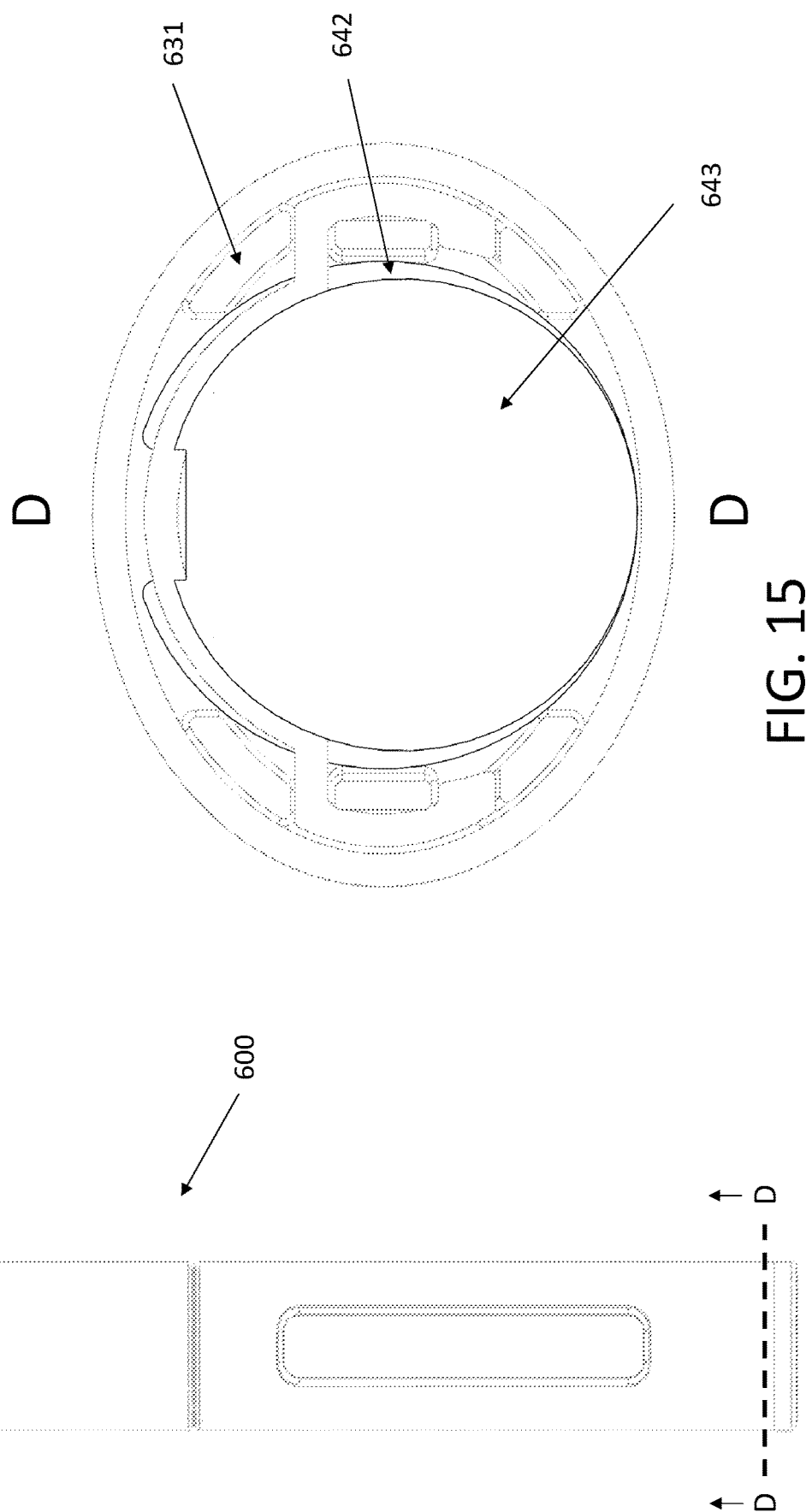
FIG. 15 shows a cross-section view D-D of the cosmetic container 600 according to some embodiments.

FIG. 15 shows a cross-section view D-D of the cosmetic container 600 according to some embodiments. In this view, base 645 houses and/or secures in place one or more of the battery 643 and wireless transmitter 642.

Figure 16:
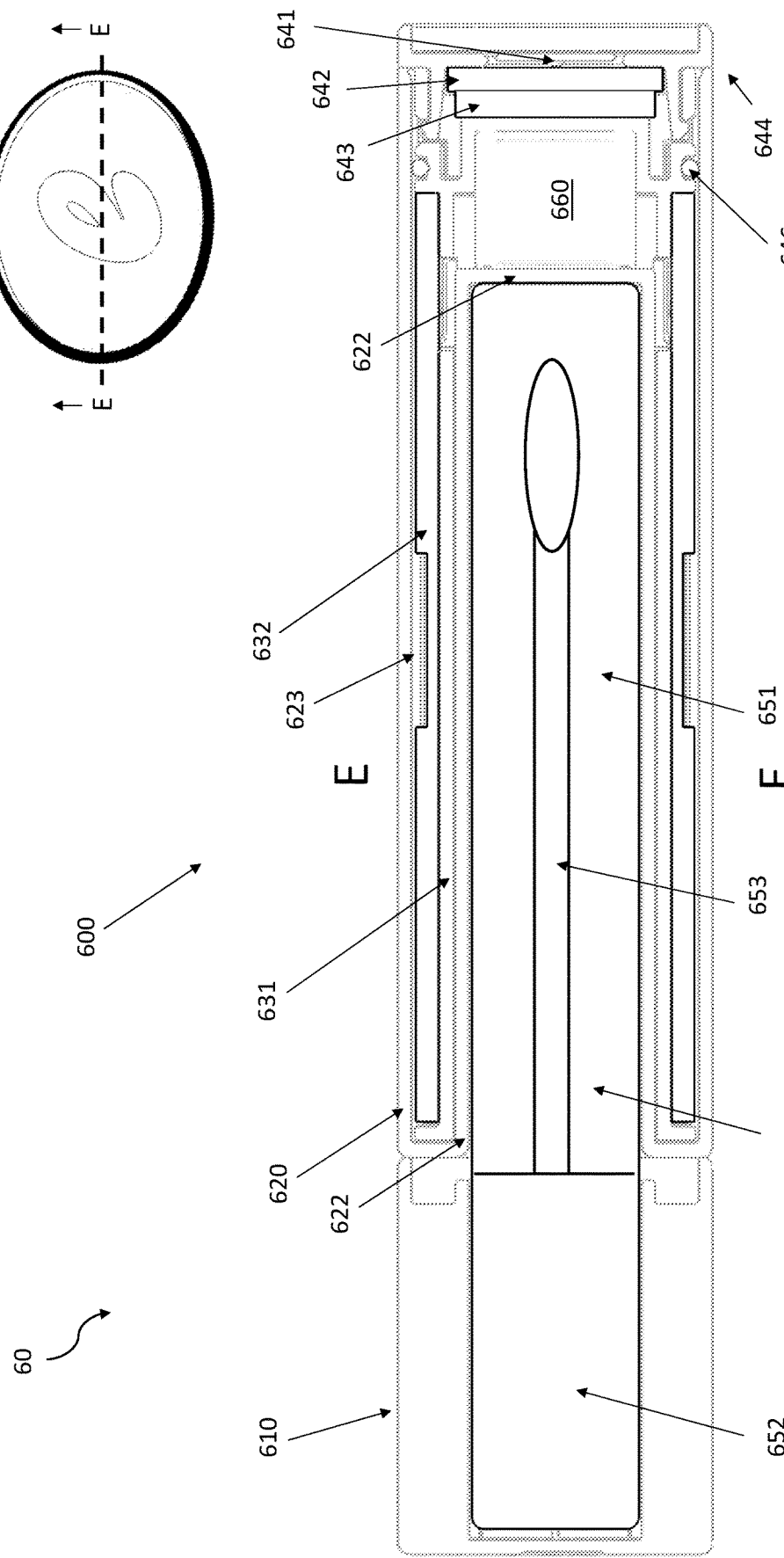
FIG. 16 illustrates a longitudinal cross-sectional view E-E of the cosmetic container 600 according to some embodiments.

FIG. 16 illustrates a longitudinal cross-sectional view E-E of the cosmetic container 600 according to some embodiments. The container body 620 is configured to house at least an item first portion 651 of a cosmetic item 650 within cosmetic chamber 622, which is viewable through the viewing window 621. Removal of the container cap 610 exposes at least an item second portion 652 of the cosmetic item 650. In some embodiments, the cosmetic item 650 is a conventional cosmetic item, such as lipstick as a non-limiting example, which allows the system 60 to be used multiple times and/or for multiple cosmetic items. The item second portion 652 of the (conventional) cosmetic item 650 may comprise makeup content (i.e., liquid makeup) and/or a makeup applicator 653 such as a brush. In some embodiments, removal of the container cap 610 is configured to enable access to the makeup content and/or makeup applicator 653 without having to reposition a first portion of the cosmetic item 650 from the container body and/or the remove the entire cosmetic item 650 from the container body 620. In some embodiments, the container cap 610 is configured to couple to the item second portion 652 such that removal of the container cap 610 also removes the applicator 653. The container cap 610 serves as a handle in this respect increasing the gripping surface area of the item second portion enabling easier makeup application. FIG. 16 also illustrates how the cosmetic item 650 item second portion 652 can be removed without removing the item first portion 651 from the container body 620. In some embodiments, an applicator 653 configured to gather makeup from the item first portion 651 is attached to the item second portion 652.

Figure 17:
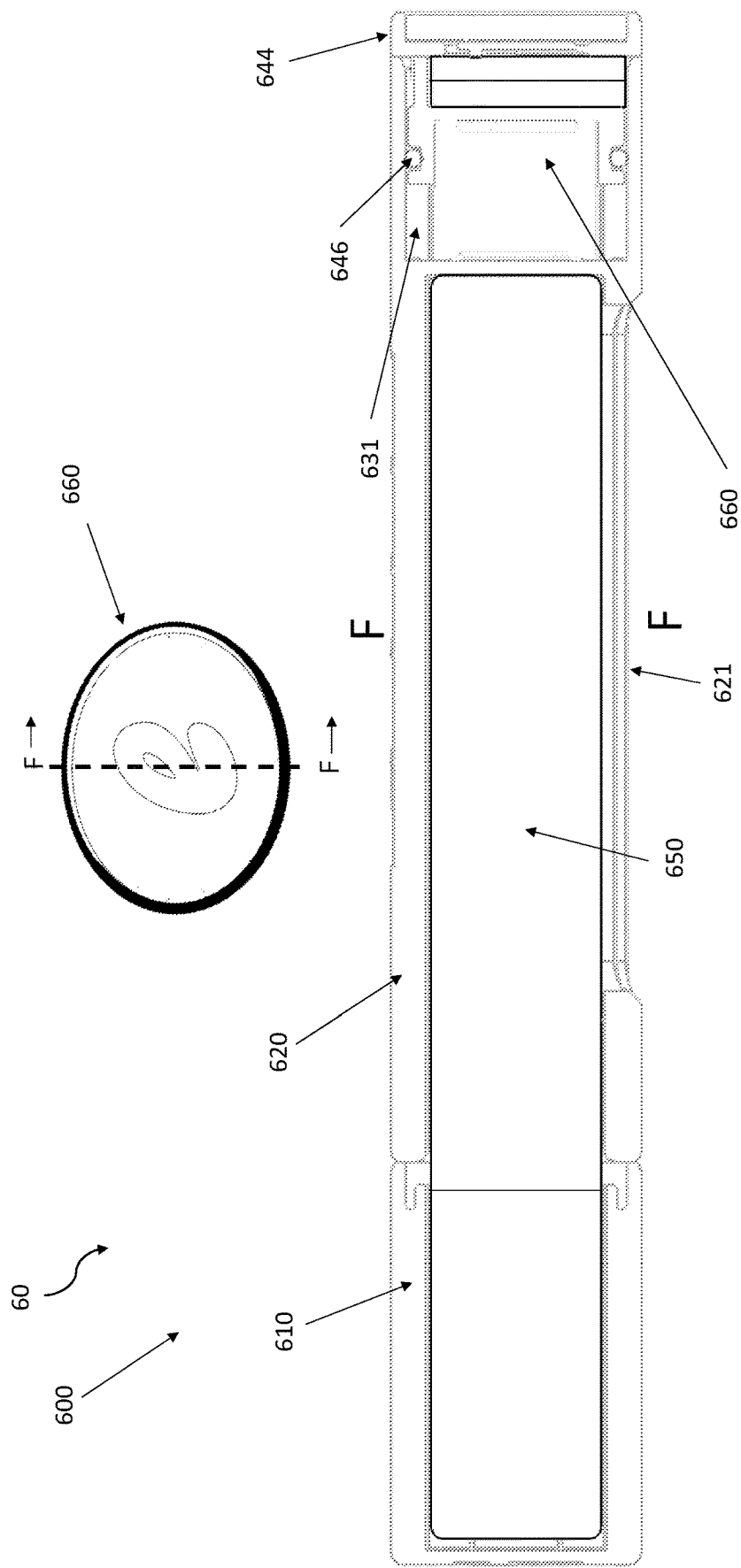
FIG. 17 shows a different longitudinal cross-section view F-F of the cosmetic container 600 according to some embodiments.

FIG. 17 shows a different longitudinal cross-section view F-F of the cosmetic container 600 according to some embodiments. With the cosmetic item 650 within the container body 620, the container cap 610 in place, and the testing shuttle 631 fully inserted, air is prevented from entering the container body 620 extending the life of one or more components. Further aiding in sealing, the testing shuttle comprises o-ring 646, which may be located adjacent the moisture absorber 660 and/or the end cap 644 according to some embodiments.

Operation

In operation, the cosmetic container provides three main functions: storage for items such as makeup; a "date-rape" drug testing kit; and an emergency alert system. To use for makeup, a user simply needs to remove the container cap 610 and remove the cosmetic item or a portion of the cosmetic item such as applicator 653 (see FIG. 16). After applying the makeup the user replaces cosmetic item 650 (or a portion of) and the container cap 610 to return the cosmetic container 600 to its assembled state. If a user becomes suspicious that their drink has been tampered with, the chemical testing assembly 630 provides a way to test for illicit chemicals.

Generally speaking, the testing shuttle 631 is configured to store one or more chemical presence indicators 632. The chemical presence indicators 632 are accessed by a user pulling on the end cap 644 and extending the testing shuttle 631 out from the container body 620. This exposes the chemical presence indicator 632 for removal from the chemical testing assembly 630 for dipping into a drink. Alternatively, a user can place a drop on the exposed chemical presence indicator 632 while it is still partially inserted into the container body 620.

Upon receiving a positive test result showing the presence of an illicit chemical, the user can send a signal to a companion device (e.g., cellular phone, smart device) using alert module 640, which implements program instructions for one or more emergency procedure steps as described herein according to various embodiments. The communication link between the cosmetic container 600 and the companion device is provided by wireless transmitter 642 which is powered by the battery 643.

Emergency Alert System

Still referring to FIGS. 1-16, various aspects of the system shown in any figure may further comprise tools for assisting a user (e.g., cosmetic item owner, concerned citizen, bartender, etc.) in contacting a hotline or other services for advice and support when navigating a potentially dangerous situation, whether or not a drink has tested positive for debilitating drugs, and whether or not an assailant is a stranger or a domestic partner.

In some embodiments, the emergency alert system may include an emergency message 261 printed onto a chemical testing surface such as test strips 240. The emergency message 261 may also include and/or be computer code that, when executed, triggers one or more aspects of the emergency alert system. Advantageously, in some embodiments the emergency message 261 includes readable text such as "I'm in danger! Please help!" so that the testing strip, with or without a positive result, can be discretely passed to an authority figure who can then remove the victim from the dangerous situation.

In some embodiments, one or more chemical testing surfaces (e.g., strips, tokens) comprise printed computer code (e.g., a QR code, barcode) configured to trigger the emergency alert system upon execution in one or more computer systems. In some embodiments, the printed computer code 160 is located on a testing surface cover (e.g., adhesive cover 151, door 430). In some embodiments, the printed computer code 260, 360, 460 is located one or more portions of the container body 210, 310, 410 and/or the container cap 220, 320, 420. Advantageously, since the printed computer code 160 triggers various other aspects of the emergency alert system it can take any form, such as one or more alphanumeric characters (e.g., "Help!"), as a non-limiting example. In some embodiments the emergency alert system comprises printed characters located one or more physical system components (e.g., cosmetic container, testing surface), where the one or more system components serve as one or more non-transitory computer readable media.

In some embodiments, alert module 640 may be configured to trigger the emergency alert system by sending a wireless signal to one or more computers. Upon receiving the signal, the one or more computers may execute computer code to send emergency messages and the like.

The emergency alert system may be integrated into a mobile application (app) and/or may direct a user to a portion of the emergency alert system (e.g., website, server) by way of an actuator 641 and/or printed computer code 160, 260 scannable by an image capturing device (e.g., a camera, laser scanner). The emergency alert system may comprise one or more tangible, non-transitory computer readable media with instructions stored thereon that when executed by one or more processors cause the one or more computers to implement one or more steps. In some embodiments, upon scanning the printed computer code 160, 260 with an image capturing device or pressing the actuator 641) the emergency alert system is configured to implement one or more of: uploading a photograph of test results to an emergency data storage 1637*b*; uploading incident evidence (e.g., photographs, videos, recordings) of the environment and/or perpetrator to the emergency data storage 1637*b*; uploading location data; notifying emergency response personnel (e.g., police, ambulance); notifying emergency contacts (set up in the app); initiating location tracking and reporting of current location to one or more emergency response teams and/or contacts; and/or initiating a safety call to and/or from emergency response teams and contacts. The emergency alert system dramatically improves safety by removing the need for the victim to manage the response to the danger, as the illicit substance may incapacitate the victim before they can find help.

In some embodiments, the system enables the victim to document the results, time, place, and even the perpetrator by opening a system app and/or mobile phone camera and scanning the printed computer code 260 and/or pressing actuator 641. The system is configured to then automatically upload photos or videos to the emergency system database, which the victim discretely obtains either directly or indirectly. The programming instructions then cause one or more computers to alert an emergency operator and/or dispatch an emergency responder to the victim's location. The alert system also sends and/or tracks the victim's location and provides that information to emergency contacts. Although the victim may begin to lose consciousness from the effects of the drug the authorities and/or contacts can locate the victim and/or perpetrator using the mobile phones global positioning system (GPS) and/or cellphone tower location data. Although the victim may become unconscious, the system is configured to provide a description of the predator to emergency responders to facilitate arrest, as well as the chemical composition of the drug (e.g., based on color, shape) so that proper medical recovery procedures can be applied.

In some embodiments, the system uses an actuator 641 in the form of an actuator button which can be used in place of the printed computer code 260 in any of the various embodiments described herein. In general, all forms of triggering the emergency alert system described herein (e.g., scanning printed code 160, 260 or actuating actuator 641) cause one or more computer implemented steps described herein, which are not repeated for various embodiments in the interest of being concise.

In a non-limiting example of a method of use of the emergency alert system as applied to FIGS. 1-5, a user witnesses a predator slip an unknown powdery substance into an unsuspecting patron's drink as she walks toward the restroom. The user takes out her cosmetic container 400 and follows the victim into the restroom where she confides in the victim what she saw. The user and victim agree to work together, and the user opens the door 430 on the container body 410 and hands the victim a test strip 440. The user then opens a camera app on her phone and scans the QR computer code 460 which automatically initiates one or more recording and/or reporting aspects of the system. The user records the testing of the drink and subsequent interaction between the victim and perpetrator using the mobile phone's video recording software which is automatically uploaded and saved by the system. The video records the victim brazenly dipping the test strip into the drink as the perpetrator looks on. She turns to confront the predator, who is enraged by the accusation. The user comes to the aid of the victim, telling the perpetrator that she saw everything and that everything is being recorded. The perpetrator steals the phone from the user and runs out of the bar.

However, the system has already been initiated and cannot be turned off without a proper password. Although this sick individual has attempted to stop the video recording by trying to power off the phone, some embodiments of the system keep recording audio and video as well as sending the phone's location to the system while presenting a powered-off screen. The user calls the hotline on the test strip and provides an account name and description of the incident to the system operator. The authorities track the thief/predator to their home, and obtain a search warrant based on the uploaded audio and video evidence. Unbeknownst to the sexual predator, the phone has been recording everything since the emergency alert system was activated so the evidence also includes a recording of a phone call made to an acquaintance admitting to the crime and asking what to do. Upon entry into the predator's home, the police find the phone, illegal date rape drugs, and a disturbing library of images of previous victims. The cooperation between the two females enables by various aspects of the system has led to this sexual predator being removed from the streets.

Figure 18:
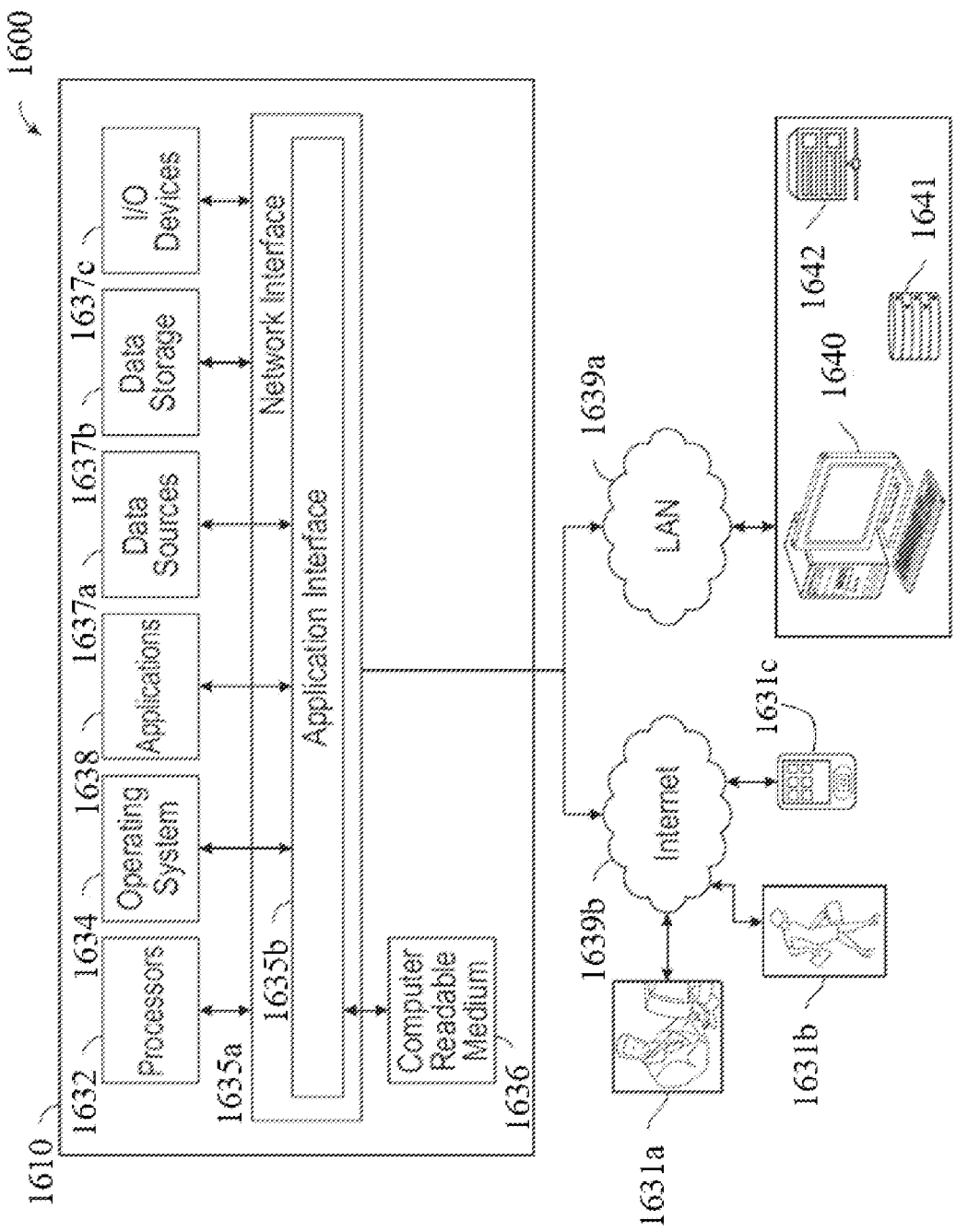
FIG. 18 illustrates aspects of an emergency alert system 1600.

FIG. 18 illustrates aspects of the system 1600 that includes computer system 1610 enabling or comprising the systems and methods described herein in accordance with some embodiments of the emergency alert system. In some embodiments, the computer system 1610 can operate and/or process printed and/or electronic computer-executable code. Further, in some embodiments, the computer system 1610 can operate and/or display information within one or more graphical user interfaces (e.g., HMIs) integrated with or coupled to the system such as through an app.

In some embodiments, the computer system 1610 can comprise at least one processor 1632. In some embodiments, the at least one processor 1632 can reside in, or coupled to, one or more conventional server platforms 1642. In some embodiments, the computer system 1610 can include a network interface 1635*a* and an application interface 1635*b* coupled to the least one processor 1632 capable of processing at least one operating system 1634. Further, in some embodiments, the interfaces 1635*a*, 1635*b* coupled to at least one processor 1632 can be configured to process one or more of software modules (e.g., such as enterprise applications 1638). In some embodiments, the software application modules 1638 can include server-based software, and can operate to host at least one user account and/or at least one client account, and operate to transfer data between one or more of these accounts using the at least one processor 1632.

With the above embodiments in mind, it is understood that the system can employ various computer-implemented operations involving data stored in computer systems. Moreover, the above-described databases and models described throughout this disclosure can store analytical models and other data on computer-readable storage media within the computer system 1610 and on non-transitory computer-readable storage media coupled to the computer system 1610 according to various embodiments. In addition, in some embodiments, the above-described applications of the system can be stored on computer-readable storage media within the computer system 1610 and on computer-readable storage media coupled to the computer system 1610. In some embodiments, these operations are those requiring physical manipulation of physical quantities. Usually, though not necessarily, in some embodiments these quantities take the form of one or more of electrical, electromagnetic, magnetic, optical, or magneto-optical signals capable of being stored, transferred, combined, compared and otherwise manipulated. In some embodiments, the computer system 1610 can comprise at least one computer readable medium 1636 coupled to one or more of at least one data source 1637*a*, at least one data storage 1637*b*, and/or at least one input/output 1637*c*. In some embodiments, the computer system 1610 can be embodied as computer readable code on a printed and/or electronic non-transitory computer readable medium 1636. In some embodiments, the non-transitory computer readable medium 1636 can be any data storage that can store data, which can thereafter be read by a computer (such as computer 1640). In some embodiments, the computer readable medium 1636 can be any physical or material medium that can be used to tangibly store the desired information or data or instructions and which can be accessed by a computer 1640 or processor 1632. In some embodiments, the computer readable medium 1636 can include hard drives, network attached storage (NAS), read-only memory, random-access memory, FLASH based memory, CD-ROMs, CD-Rs, CD-RWs, DVDs, magnetic tapes, other optical and non-optical data storage. In some embodiments, various other forms of computer-readable media 1636 can transmit or carry instructions to a remote computer 1640 and/or at least one user 1631, including a router, private or public network, or other transmission or channel, both wired and wireless. In some embodiments, the software application modules 638 can be configured to send and receive data from a database (e.g., from a computer readable medium 1636 including data sources 1637*a* and data storage 1637*b* that can comprise a database), and data can be received by the software application modules 1638 from at least one other source. In some embodiments, at least one of the software application modules 1638 can be configured within the computer system 1610 to output data to at least one user 1631 via at least one graphical user interface rendered on at least one digital display.

In some embodiments, the computer readable medium 1636 can be distributed over a conventional computer network via the network interface 1635*a* where the system embodied by the computer readable code can be stored and executed in a distributed fashion. For example, in some embodiments, one or more components of the computer system 1610 can be coupled to send and/or receive data through a local area network ("LAN") 1639*a* and/or an internet coupled network 1639*b* (e.g., such as a wireless internet). In some embodiments, the networks 1639*a*, 1639*b* can include wide area networks ("WAN"), direct connections (e.g., through a universal serial bus port), or other forms of computer-readable media 1636, or any combination thereof.

In some embodiments, components of the networks 1639*a*, 1639*b* can include any number of personal computers 1640 which include for example desktop computers, and/or laptop computers, or any fixed, generally non-mobile internet appliances coupled through the LAN 1639*a*. For example, some embodiments include one or more of personal computers 1640, databases 1641, and/or servers 1642 coupled through the LAN 1639*a* that can be configured for any type of user including an administrator. Some embodiments can include one or more personal computers 1640 coupled through network 1639*b*. In some embodiments, one or more components of the computer system 1610 can be coupled to send or receive data through an internet network (e.g., such as network 1639*b*). For example, some embodiments include at least one user 1631*a*, 1631*b*, is coupled wirelessly and accessing one or more software modules of the system including at least one enterprise application 1638 via an input and output ("I/O") 1637*c*. In some embodiments, the computer system 1610 can enable at least one user 1631*a*, 1631*b*, to be coupled to access enterprise applications 1638 via an I/O 1637*c* through LAN 1639*a*. In some embodiments, the user 1631 can comprise a user 1631*a* coupled to the computer system 1610 using a desktop computer, and/or laptop computers, or any fixed, generally non-mobile internet appliances coupled through the internet 1639*b*. In some embodiments, the user can comprise a mobile user 16321*b* coupled to the computer system 1610. In some embodiments, the user 1631*b* can connect using any mobile computing 1631*c* to wireless coupled to the computer system 1610, including, but not limited to, one or more personal digital assistants, at least one cellular phone, at least one mobile phone, at least one smart phone, at least one pager, at least one digital tablets, and/or at least one fixed or mobile internet appliances.

System General Overview

With general reference to one or more figures displaying various aspects of the system, the disclosure is generally directed to a system for testing chemical compositions. In some embodiments, the system comprises a cosmetic container and one or more chemical testing surfaces. In some embodiments, the cosmetic container is configured to house one or more cosmetic items. In some embodiments, the one or more chemical presence indicators are configured to indicate the presence of one or more chemicals within a liquid. In some embodiments, the one or more chemical presence indicators are coupled to the cosmetic container.

In some embodiments, the cosmetic container comprises a container lid. In some embodiments, the cosmetic container comprises a container body. In some embodiments, at least one of the container lid and the container body comprise an indicator housing section, the indicator housing section configured to secure the chemical presence indicator in a fixed position. In some embodiments, the one or more chemical testing surfaces comprise one or more of a testing strip and a testing token. In some embodiments, the testing strip and/or the testing token is removably attached to one or more of the container lid and the container body.

In some embodiments, the system further comprises one or more computer code actuators and one or more computers comprising one or more processors and one or more electronic non-transitory computer readable media. In some embodiments, the electronic non-transitory computer readable media includes instructions stored thereon that are executable by actuating the computer code actuator. In some embodiments, the one or more computer code actuators are coupled to one or more of the container lid and the container body. In some embodiments, the instructions include an initiation of an emergency alert system by the one or more computers.

In some embodiments, the system comprises one or more of a container body, a container cap, a chemical testing assembly, and an actuator cap. In some embodiments, the container body is configured to house an item first portion of a cosmetic item. In some embodiments, the container cap is configured to house an item second portion of the cosmetic item. In some embodiments, the container cap is configured to securely couple to a container first end of the container body and/or the item second portion. In some embodiments, removing the container cap is configured to enable access to makeup within cosmetic item without removing the item first portion from the container body.

In some embodiments, the chemical testing assembly is configured to securely couple to a container second end of the container body. In some embodiments, the chemical testing assembly comprises the actuator cap. In some embodiments, manipulating the actuator cap is configured to enable access to the chemical testing assembly. In some embodiments, the chemical testing assembly comprises one or more chemical presence indicators configured to test for one or more chemicals.

In some embodiments, the actuator cap is configured to securely couple to the container body. In some embodiments, the actuator cap is configured to house a computer code actuator. In some embodiments, the computer code actuator is configured to cause the execution of computer code. In some embodiments, the computer code actuator comprises an actuator button. In some embodiments, depressing the actuator button is configured to execute a wireless connection to one or more computers.

In some embodiments, the chemical testing assembly comprises one or more of a testing shuttle, one or more chemical presence indicators, and a moisture absorber. In some embodiments, the container body is configured to house at least a portion of the chemical testing assembly. In some embodiments, manipulating the actuator cap is configured to enable the testing shuttle to be removed from an interior portion of the container body. In some embodiments, the one or more chemical presence indicators are coupled to the testing shuttle. In some embodiments, the moisture absorber is coupled to the testing shuttle.

In some embodiments, the moisture absorber is configured to remove and store moisture from air. In some embodiments, the shuttle and/or container body are configured to provide a fluid path between the one or more chemical presence indicators and the moisture absorber when the testing shuttle is housed within the container body and at least a portion of the actuator cap is in contact with the container second end.

In some embodiments, the system comprises one or more of a container body, a chemical testing assembly, and a computer code actuator. In some embodiments, the chemical testing assembly is configured to couple to at least a portion of the container body. In some embodiments, the computer code actuator is configured to execute computer code in one or more computers. In some embodiments, the system comprises a testing shuttle, an actuator button, and an actuator battery. In some embodiments, the chemical testing assembly comprises the testing shuttle. In some embodiments, the testing shuttle is configured to secure the actuator battery in a fixed position. In some embodiments, the testing shuttle is configured to secure the actuator button in a fixed position. In some embodiments, the actuator battery is electrically coupled to the actuator button.

In some embodiments, the container body is configured to house at least a portion of the chemical testing assembly in a container interior portion of the container body. In some embodiments, the chemical testing assembly comprises one or more chemical presence indicators. In some embodiments, the one or more chemical presence indicators are configured to indicate a type of chemical present in a liquid. In some embodiments, an actuation of the computer code actuator is configured to execute a wireless connection to one or more computers. In some embodiments, the one or more computers are configured to generate a communication to one or more other computers upon the actuation.

In some embodiments, the cosmetic container is configured to house lipstick. In some embodiments, the cosmetic container comprises a compact makeup kit.

The subject matter described herein are directed to technological improvements to the field of safety by integrating a testing kit and an alert trigger into a cosmetic item. The disclosure also describes the specifics of how a machine including one or more computers comprising one or more processors and one or more non-transitory computer readable media implement the system and its improvements over the prior art. The instructions executed by the machine cannot be performed in the human mind or derived by a human using a pen and paper but requires the machine to convert process input data to useful output data. Moreover, the claims presented herein do not attempt to tie-up a judicial exception with known conventional steps implemented by a general-purpose computer; nor do they attempt to tie-up a judicial exception by simply linking it to a technological field. Indeed, the systems and methods described herein were unknown and/or not present in the public domain at the time of filing, and they provide technologic improvements advantages not known in the prior art. Furthermore, the system includes unconventional steps that confine the claim to a useful application.

It is understood that the system is not limited in its application to the details of construction and the arrangement of components set forth in the previous description or illustrated in the drawings. The system and methods disclosed herein fall within the scope of numerous embodiments. The previous discussion is presented to enable a person skilled in the art to make and use embodiments of the system. Any portion of the structures and/or principles included in some embodiments can be applied to any and/or all embodiments: it is understood that features from some embodiments presented herein are combinable with other features according to some other embodiments. Thus, some embodiments of the system are not intended to be limited to what is illustrated but are to be accorded the widest scope consistent with all principles and features disclosed herein.

Some embodiments of the system are presented with specific values and/or setpoints. These values and setpoints are not intended to be limiting and are merely examples of a higher configuration versus a lower configuration and are intended as an aid for those of ordinary skill to make and use the system.

References to a test "strip" or "token" is a general reference to a surface configured to detect and/or display the presences of one or more chemicals and does not limit the surface to a particular shape or dimension.

Furthermore, acting as Applicant's own lexicographer, Applicant imparts the explicit meaning and/or disavow of claim scope to the following terms:

Applicant defines any use of "and/or" such as, for example, "A and/or B," or "at least one of A and/or B" to mean element A alone, element B alone, or elements A and B together. In addition, a recitation of "at least one of A, B, and C," a recitation of "at least one of A, B, or C," or a recitation of "at least one of A, B, or C or any combination thereof" are each defined to mean element A alone, element B alone, element C alone, or any combination of elements A, B and C, such as AB, AC, BC, or ABC, for example.

"Substantially" and "approximately" when used in conjunction with a value encompass a difference of 5% or less of the same unit and/or scale of that being measured.

"Simultaneously" as used herein includes lag and/or latency times associated with a conventional and/or proprietary computer, such as processors and/or networks described herein attempting to process multiple types of data at the same time. "Simultaneously" also includes the time it takes for digital signals to transfer from one physical location to another, be it over a wireless and/or wired network, and/or within processor circuitry.

As used herein, "can" or "may" or derivations there of (e.g., the system display can show X) are used for descriptive purposes only and is understood to be synonymous and/or interchangeable with "configured to" (e.g., the computer is configured to execute instructions X) when defining the metes and bounds of the system.

In addition, the term "configured to" means that the limitations recited in the specification and/or the claims must be arranged in such a way to perform the recited function: "configured to" excludes structures in the art that are "capable of" being modified to perform the recited function but the disclosures associated with the art have no explicit teachings to do so. For example, a recitation of a "container configured to receive a fluid from structure X at an upper portion and deliver fluid from a lower portion to structure Y" is limited to systems where structure X, structure Y, and the container are all disclosed as arranged to perform the recited function. The recitation "configured to" excludes elements that may be "capable of" performing the recited function simply by virtue of their construction but associated disclosures (or lack thereof) provide no teachings to make such a modification to meet the functional limitations between all structures recited. Another example is "a computer system configured to or programmed to execute a series of instructions X, Y, and Z." In this example, the instructions must be present on a non-transitory computer readable medium such that the computer system is "configured to" and/or "programmed to" execute the recited instructions: "configure to" and/or "programmed to" excludes art teaching computer systems with non-transitory computer readable media merely "capable of" having the recited instructions stored thereon but have no teachings of the instructions X, Y, and Z programmed and stored thereon. The recitation "configured to" can also be interpreted as synonymous with operatively connected when used in conjunction with physical structures.

It is understood that the phraseology and terminology used herein is for description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The previous detailed description is to be read with reference to the figures, in which like elements in different figures have like reference numerals. The figures, which are not necessarily to scale, depict some embodiments and are not intended to limit the scope of embodiments of the system.

Any of the operations described herein that form part of the invention are useful machine operations. The invention also relates to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general-purpose computer selectively activated or configured by one or more computer programs stored in the computer memory, cache, or obtained over a network. When data is obtained over a network the data can be processed by other computers on the network, e.g. a cloud of computing resources.

The embodiments of the invention can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, some embodiments include methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

Although method operations are presented in a specific order according to some embodiments, the execution of those steps do not necessarily occur in the order listed unless explicitly specified. Also, other housekeeping operations can be performed in between operations, operations can be adjusted so that they occur at slightly different times, and/or operations can be distributed in a system which allows the occurrence of the processing operations at various intervals associated with the processing, as long as the processing of the overlay operations are performed in the desired way and result in the desired system output.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A cosmetic container comprising:
    a container body,
    a cosmetic item housed within an interior of the container body and accessible via a first removable cap on a first end of the container body,
    a chemical testing assembly having a chemical presence indicator configured to indicate the presence of one or more chemicals within a liquid when the liquid is applied to the chemical presence indicator, the chemical testing assembly being configured for insertion into and removal from an interior of the container body and accessible via a second removable cap on a second end of the container body, and
    an electronic module comprising a wireless transmitter and an actuator contained within the second removable cap, the actuator being exposed to an exterior of the cosmetic container and configured to cause the wireless transmitter to emit a signal to be received by an electronic device when actuated,
    wherein the chemical testing assembly is coupled to the second removable cap such that removing the second removable cap causes the chemical testing assembly to extend from within the interior of the container body and expose at least a portion of the chemical presence indicator for chemical testing of the liquid.

2. The cosmetic container of claim 1,
    wherein at least a portion of the chemical testing assembly is shaped and dimensioned to nest with at least a portion of the cosmetic item when the chemical testing assembly is inserted into the interior of the container body.

3. The cosmetic container of claim 1, wherein the chemical testing assembly comprises one or more openings proximate the second removable cap through which air within the interior of the container body can escape as the chemical testing assembly is inserted into the interior of the container body via the second end.

4. The cosmetic container of claim 1, further comprising a moisture absorber in fluid communication with the chemical presence indicator within the interior of the container body.

5. The cosmetic container of claim 4, wherein the moisture absorber is not in fluid communication with the cosmetic item within the interior of the container body.

6. The cosmetic container of claim 1, wherein the signal is configured to, when received by an electronic device, cause a processor of the electronic device to execute instructions stored on non-transitory computer readable media in communication with the processor.

7. The cosmetic container of claim 6, wherein the instructions cause the electronic device to initiate an emergency alert system.

8. The cosmetic container of claim 6, wherein the instructions cause the electronic device to communicate a predetermined message to an electronic device of a predetermined recipient.

9. A system for testing chemical compositions, comprising:
   a cosmetic container configured to house one or more cosmetic items; and
   a chemical presence indicator configured to indicate the presence of one or more chemicals within a liquid when the liquid is applied to the chemical presence indicator;
   wherein the cosmetic container comprises an interior portion within which the chemical presence indicator is housed,
   wherein the cosmetic container includes a member having a first portion configured to be inserted into the interior portion of the cosmetic container through an opening in the cosmetic container and a second portion forming an outer surface of the cosmetic container when the first portion is fully inserted into the interior portion of the cosmetic container through the opening,
   wherein the member is configured to extend outwards from the cosmetic container such that at least some of the first portion of the member is removed from the interior portion through the opening, thereby exposing the removed portion of the first portion of the member to an area outside of the cosmetic container, and
   wherein the chemical presence indicator is coupled to the first portion of the member such that a corresponding portion of the chemical presence indicator is exposed for testing when the member is extended outwards from the cosmetic container.

10. The system of claim 9, wherein the chemical presence indicator comprises a testing strip or a testing token.

11. The system of claim 9, wherein the member comprises a testing shuttle affixed to an end cap of the cosmetic container.

12. The system of claim 9, further comprising at least one of the following:
   a printed code that, when read by an electronic device, causes a processor of the electronic device to execute instructions stored on non-transitory computer readable media in communication with the processor, and
   an electronic module comprising an actuator and a wireless transmitter, wherein the actuating the actuator causes the wireless transmitter to emit a signal that, when received by an electronic device, causes a processor of the electronic device to execute instructions stored on non-transitory computer readable media in communication with the processor.

13. The system of claim 12, wherein the instructions cause the electronic device to initiate an emergency alert system.

14. A system for testing chemical compositions, comprising:
   a cosmetic container configured to house one or more cosmetic items; and
   a chemical presence indicator configured to indicate the presence of one or more chemicals within a liquid when the liquid is applied to the chemical presence indicator;
   wherein the chemical presence indicator is coupled to an outer surface of the cosmetic container and covered with a protective covering.

15. The system of claim 14, wherein the chemical presence indicator comprises a testing strip or a testing token.

16. The system of claim 14, further comprising at least one of the following:
   a printed code that, when read by an electronic device, causes a processor of the electronic device to execute instructions stored on non-transitory computer readable media in communication with the processor, and
   an electronic module comprising an actuator and a wireless transmitter, wherein the actuating the actuator causes the wireless transmitter to emit a signal that, when received by an electronic device, causes a processor of the electronic device to execute instructions stored on non-transitory computer readable media in communication with the processor.

17. The system of claim 16, wherein the instructions cause the electronic device to initiate an emergency alert system.

* * * * *